US012762456B2

(12) United States Patent
Lackey et al.

(10) Patent No.: US 12,762,456 B2
(45) Date of Patent: Oct. 13, 2026

(54) COMPUTING PHYSICAL REPRESENTATION MATRIX OF LOGICAL CLIFFORD OPERATION

(71) Applicant: Microsoft Technology Licensing, LLC, Redmond, WA (US)

(72) Inventors: Bradley Curtis Lackey, Redmond, WA (US); Mathias Soeken, Montreux (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 18/826,100

(22) Filed: Sep. 5, 2024

(65) Prior Publication Data

US 2026/0065122 A1 Mar. 5, 2026

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ................................ G06N 10/70; G06N 10/20
USPC ................................. 326/7; 716/104; 706/14
See application file for complete search history.

(56) References Cited

PUBLICATIONS

Schneider et al.( A SAT Encoding for Optimal Clifford Circuit Synthesis, Published: Jan. 16, 2023 Citation in BibTeX format ASPDAC '23: 28th Asia and South Pacific Design Automation Conference Jan. 16-19, 2023 Tokyo, Japan.*
Gottesman, Daniel, "Stabilizer Codes and Quantum Error Correction", In Repository of arXiv:quant-ph/9705052v1, May 28, 1997, 122 Pages.
Gottesman, Daniel, "The heisenberg representation of quantum computers", In Proceedings of the XXII International Colloquium on Group Theoretical Methods in Physics, 20 pages.
NPL_Brad Lackey, et al., "Logical Operators on Stabilizer Codes", Microsoft Quantum, May 29, 2024, pp. 1-15.
NPL_Craig Gidney, "Stim: A Fast Stabilizer Circuit Simulator", arXiv:2103.02202v3 [quant-ph], Jun. 18, 2021, pp. 1-26.
NPL_Dmitri Maslov, "Linear Depth Stabilizer and Quantum Fourier Transformation Circuits with No Auxiliary Qubits in Finite-Neighbor Quantum Architectures", Physical Review A, 76, 052310, American Physical Society, arXiv:quant-ph/0703211v1, 2007, pp. 1-9.
NPL_Gottesman, Daniel, "A Class of Quantum Error-Correcting Codes Saturating the Quantum Hamming Bound", arXiv:quant-ph/9604038v2, Jul. 24, 1996, pp. 1-22.

(Continued)

*Primary Examiner* — Arnold M Kinkead
(74) *Attorney, Agent, or Firm* — Alleman Hall LLP

(57) ABSTRACT

A computing system is provided, including one or more processing devices configured to receive an extended stabilizer form of a quantum error correction code. The one or more processing devices are further configured to receive a logical Clifford operation specification of a logical Clifford operation. Based at least in part on the extended stabilizer form, the one or more processing devices are further configured to compute a stabilizer tableau of the quantum error correction code. Based at least in part on the stabilizer tableau and the logical Clifford operation specification, the one or more processing devices are further configured to compute a physical representation matrix of the logical Clifford operation. The one or more processing devices are further configured to output the physical representation matrix.

18 Claims, 10 Drawing Sheets

(56) References Cited

PUBLICATIONS

NPL_Knill, “Fault-Tolerant Postselected Quantum Computation: Schemes”, arXiv:quant-ph/0402171v1, Feb. 23, 2024, pp. 1-17.
NPL_Knill, “Scalable Quantum Computation in the Presence of Large Detected-Error Rates”, arXiv:quant-ph/0312190v2, Dec. 9, 2004, pp. 1-16.
NPL_Mark M. Wilde, “Logical Operators of Quantum Codes”, Physical Review A, 76(6): 062322, 2009, pp. 1-6.
NPL_Michael A. Nielsen and Isaac L. Chuang. “Quantum Computation and Quantum Information.” Cambridge University Press, 10th Anniversary Edition, 2010. 704 pages.
NPL_Narayanan Rengaswamy, et al. “Synthesis of Logical Clifford Operators via Symplectic Geometry.” 2018 IEEE International Symposium on Information Theory (ISIT) (2018). zrXiv:1803.06987v1 [cs.IT], Mar. 19, 2018. pp. 1-32.
NPL_Narayanan Rengaswamy, et al., “Logical Clifford Synthesis for Stabilizer Codes”, IEEE Transactions on Quantum Engineering, vol. 4, 2016. arXiv:1907.00310v2 [quant-ph], Aug. 18, 2021, pp. 1-17.
NPL_Philipp Niemann, et al., “Efficient Synthesis of Quantum Circuits Implementing Clifford Group Operations”. 2014 19th Asia and South Pacific Design Automation Conference (ASP-DAC), Singapore, IEEE, 2014, pp. 483-488.
NPL_Robert Rand, et al., “Gottesman Types for Quantum Programs”, arXiv:2109.02197, EPTCS 340, 2021, pp. 279-290.
NPL_Sarah Schneider, et al., “A SAT Encoding for Optimal Clifford Circuit Synthesis”, 2023 28th Asia and South Pacific Design Automation Conference (ASP-DAC), Tokyo, Japan, 2023, pp. 190-195.
NPL_Scott Aaronson, et al., “CHP: CNOT-Hadamard-Phase”, https://www.scottaaronson.com/chp/, Feb. 6, 2005, pp. 1-2.
NPL_Scott Aaronson, et al., “Improved Simulation of Stabilizer Circuits”, Physical Review A 70, 052328, The American Physical Society, Nov. 30, 2004, pp. 1-15.
Extended European Search Report Received for Application No. 25197558.7, Jan. 23, 2026, 10 Pages.

* cited by examiner

COMPUTING PHYSICAL REPRESENTATION MATRIX OF LOGICAL CLIFFORD OPERATION

BACKGROUND

At quantum computing devices, computations are performed by manipulating data stored in the form of qubits. Whereas conventional computer memory holds digital data in an array of bits and enacts bit-wise logic operations, a quantum computing device stores data in an array of qubits and performs quantum-mechanical operations on the qubits in order to implement computations. By performing operations on qubits instead of classical bits, some computational tasks may be performed with lower computational complexity.

Error in quantum computations presents a challenge for quantum computing device development and implementation. Noise (e.g., thermal noise) at the quantum computing device may affect the outcomes of measurements and may accordingly produce errors in computations. In order to make quantum computing devices more robust to potential sources of error, existing quantum computing devices are cooled to low temperatures. In addition, error correction protocols are implemented at existing quantum computing devices. These error correction protocols utilize collections of physical qubits to form logical qubits that are used to perform computations. At these collections of physical qubits, quantum error correction codes are implemented to maintain the accuracy of the logical operations even when errors occur at the physical qubits.

SUMMARY

According to one aspect of the present disclosure, a computing system is provided, including one or more processing devices configured to receive an extended stabilizer form of a quantum error correction code. The one or more processing devices are further configured to receive a logical Clifford operation specification of a logical Clifford operation. Based at least in part on the extended stabilizer form, the one or more processing devices are further configured to compute a stabilizer tableau of the quantum error correction code. Based at least in part on the stabilizer tableau and the logical Clifford operation specification, the one or more processing devices are further configured to compute a physical representation matrix of the logical Clifford operation. The one or more processing devices are further configured to output the physical representation matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
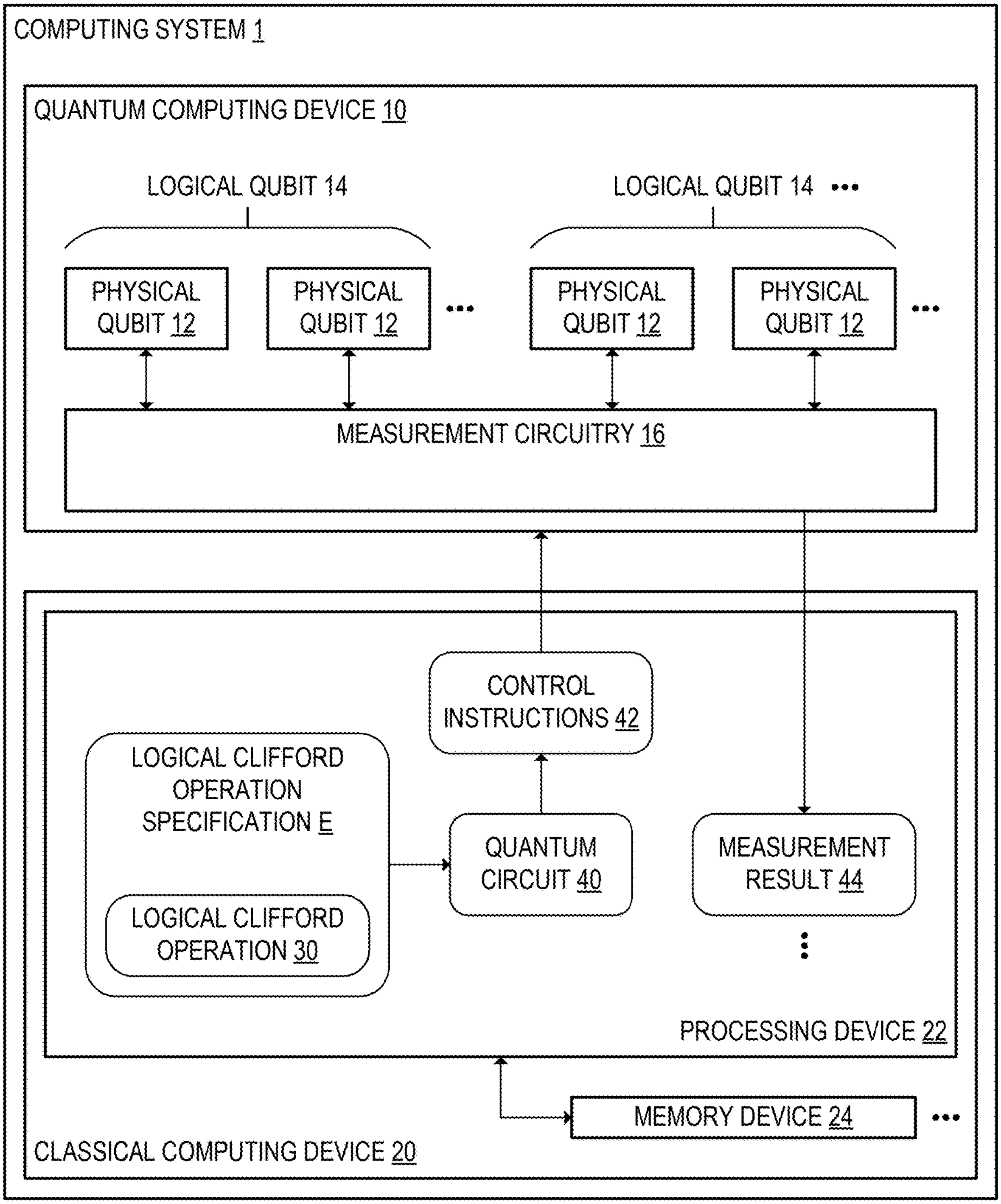
FIG. 1 schematically shows a computing system including a quantum computing device coupled to a classical computing device, according to one example embodiment.

In order to perform a logical-level computation at a quantum computing device, the logical operations included in that computation are converted into hardware-level instructions. Those hardware-level instructions are then executed at the quantum computing device. However, the mapping between a logical operation and a set of hardware-level instructions depends on the specific quantum error correction code that is used to encode the logical qubits.

The following discussion pertains to computing physical representations of logical Clifford operations. Clifford operations are quantum operations included in the Clifford group, which is the group of unitary operators that normalize the Pauli group. The group of Clifford unitaries is defined as follows:

$$C_n = \{V \in U_{2^n} \mid VP_nV^\dagger = P_n\}$$

In the above equation, n is the number of qubits, $U_{2^n}$ is the set of $2^n$-dimensional unitary matrices, and $P_n$ is the n-qubit Pauli group. The Pauli group is defined as follows in the n-qubit case:

$$P_n = \left\{ e^{\frac{i\theta\pi}{2}} \sigma_{j_1} \otimes \ldots \otimes \sigma_{j_n} \,\middle|\, \theta = 0, 1, 2, 3, j_k = 0, 1, 2, 3 \right\}$$

where $\sigma_0, \ldots \sigma_3$ are the one-qubit Pauli matrices.

A Clifford circuit is a quantum circuit constructed from Clifford operations. According to the Gottesman-Knill theorem, an arbitrary Clifford circuit on n qubits can be expressed in polynomial time as a 2n×2n binary matrix, up to possible correction by Pauli operators. This binary matrix satisfies an algebraic relation (defining a symplectic matrix) that encodes the lack of commutativity in Pauli operators. The task of finding a Clifford circuit that implements a given logical Clifford operator therefore reduces to finding a 2n×2n binary symplectic matrix, where n is the length of the quantum error correction code or the number of physical qubits used to encode quantum data in the quantum error correction code, that represents a logical operation on the code.

One previous approach to computing the binary symplectic matrix corresponding to a logical Clifford operator is the symplectic transvectant method, which includes constructing linear equations in the entries of a 2n×2n binary matrix. These linear equations specify a logical operation on the given quantum error correction code and reproduce the behavior of the given logical Clifford operator. However, generating a symplectic matrix using this previous approach has nonlinear time complexity. In this previous approach, the symplectic matrix is computed using an iterative method.

The following discussion presents systems and methods that directly and efficiently compute a symplectic matrix that represents a logical Clifford operator. As discussed in further detail below, the method provided herein includes computing a stabilizer tableau associated with a quantum error correction code. Computing the stabilizer tableau includes computing a respective destabilizer associated with each stabilizer. These destabilizers can be selected to have minimum Hamming weights, which can increase the efficiency of the resulting Clifford circuit. The method provided herein further includes computing another symplectic matrix that represents the logical action of the Clifford operation. The stabilizer tableau is subsequently used as a change-of-frame matrix to move from a stabilizer basis of the quantum code to a computational basis of the underlying physical qubits. The Clifford operation is accordingly converted into a physical representation.

The techniques discussed below are implemented at a computing system 1, which is schematically depicted in FIG. 1 according to one example embodiment. The computing system 1 of FIG. 1 includes a quantum computing device 10 that is coupled to a classical computing device 20. A plurality of physical qubits 12 are instantiated at the quantum computing device 10 and are used to perform quantum computations as discussed below. Sets of the physical qubits 12 are used to construct a respective plurality of logical qubits 14. In addition, the quantum computing device 10 includes measurement circuitry 16 that is used to measure observables of the physical qubits 12. The measurement circuitry 16 is further configured to transmit measurement results 44 to the classical computing device 20.

The classical computing device 20 depicted in the example of FIG. 1 includes one or more processing devices 22 and one or more memory devices 24. The one or more processing devices 22 may, for example, include one or more central processing units (CPUs), graphics processing units (GPUs), application-specific integrated circuits (ASICs), specialized hardware accelerators, and/or other types of processing devices. The one or more memory devices 24 may include one or more volatile memory devices and/or one or more non-volatile storage devices. In some examples, the functionality of the one or more processing devices 22 and/or the one or more memory devices 24 is distributed across a plurality of communicatively interconnected physical computing devices, such as a plurality of server computing devices located at a data center. The plurality of physical computing devices that form the classical computing device 20 may include one or more physical computing devices that are not directly coupled to the quantum computing device 10.

The one or more processing devices 22 of the classical computing device 20 are configured to receive a logical Clifford operation specification E of a logical Clifford operation 30. This logical Clifford operation specification E may be included in a quantum program that is received (e.g., as user input) for execution at the quantum computing device 10. Using at least the logical Clifford operation specification E as input, the one or more processing devices 22 are configured to compute a quantum circuit 40 specifying a physical-qubit-level implementation of the logical Clifford operation 30. The quantum circuit 40 is computed using the approaches discussed below.

The one or more processing devices 22 are further configured to compute control instructions 42 for the quantum computing device 10 based at least in part on the quantum circuit 40, and to transmit the control instructions 42 to the quantum computing device 10. Thus, the one or more processing devices 22 are configured to control the quantum computing device 10 to implement the logical Clifford operation 30 by executing the quantum circuit 40.

The one or more processing devices 22 are further configured to receive measurement results 44 from the measurement circuitry 16 of the quantum computing device 10. The one or more processing devices 22 are accordingly configured to offload a computation to the quantum computing device 10 to perform that computation in a manner that has a reduced computational complexity relative to performing that computation at the classical computing device 20.

As discussed above, a stabilizer tableau U is used when computing the quantum circuit 40. Formalism related to the stabilizer tableau is presented as follows. $\mathfrak{C}$ is defined as an $[\![n, k]\!]$ stabilizer code with the stabilizer group $\mathcal{S}=\mathcal{S}(\mathfrak{C})$, where n is the number of physical qubits and k is the number of logical qubits. The stabilizer group $\mathcal{S}$ is a group of commuting operators S for which $P|\psi\rangle\rangle=|\psi\rangle$, where $|\psi\rangle$ is a quantum state. The stabilizer group $\mathcal{S}$ may be defined in terms of its generators as $\mathcal{S}=\langle S_1, \ldots, S_{n-k}\rangle$.

For the stabilizer group $\mathcal{S}$, a check matrix may be written as:

$$c(\mathcal{S}) = \begin{pmatrix} c(S_1) \\ \vdots \\ c(S_{n-k}) \end{pmatrix}$$

This check matrix is a matrix representation of a linear transformation $$c(\mathcal{S}): \mathbb{F}_2^{2n} \to \mathbb{F}_2^{2n}$$

of rank n−k. Here, each Pauli operator is mapped to two bits according to $c(X^xZ^z)=(x, z)$, where any overall phase is discarded. In the following discussion, the ordering of the 2n entries of a check row is $c(P)=(x_1, z_1, x_2, z_2, \ldots, x_n, z_n)$. Thus, the check row is a binary encoding of a Pauli operator $P=P_1 \otimes \ldots \otimes P_n$.

Each vector in the image of $c(\mathcal{S})$ represents one of the stabilizers. Since the stabilizers all commute with each other, the image forms an (n−k)-dimensional isotropic subspace of $$\mathbb{F}_2^{2n}$$

with respect to a canonical symplectic form. The canonical symplectic form, which is based on the ordering of the 2n entries of a check row, is given as follows:

$$\Lambda_n = \begin{pmatrix} 0 & 1 & 0 & 0 & \dots & 0 & 0 \\ 1 & 0 & 0 & 0 & \dots & 0 & 0 \\ 0 & 0 & 0 & 1 & \dots & 0 & 0 \\ 0 & 0 & 1 & 0 & \dots & 0 & 0 \\ \vdots & \vdots & \vdots & \vdots & \ddots & \vdots & \vdots \\ 0 & 0 & 0 & 0 & \dots & 0 & 1 \\ 0 & 0 & 0 & 0 & \dots & 1 & 0 \end{pmatrix} = \begin{pmatrix} \Lambda_2 & & & \\ & \Lambda_2 & & \\ & & \ddots & \\ & & & \Lambda_2 \end{pmatrix}$$

Thus, the canonical symplectic form satisfies the matrix relation $c(\mathcal{S})\Lambda_n c(\mathcal{S})^t=0$.

A normalizer of the stabilizer code $\mathfrak{C}$ is defined as follows:

$$\mathcal{N} = \mathcal{N}(\mathbb{C}) = \{P \in \mathcal{P}^n : LP = PL \ \forall\ L \in \mathcal{S}(\mathbb{C})\}$$

Elements of the normalizer preserve the code space. These elements of the normalizer include the stabilizers themselves. The elements of the normalizer generally act non-trivially on codewords, and so are identified as logical Pauli operators on the quantum error correction code. A specific element of the normalizer may be mapped to multiple different logical Pauli operators. In the following discussion, a fixed selection of Pauli operators $\overline{X}_1, \overline{Z}_1, \dots, \overline{X}_k, \overline{Z}_k$ is used. This selection satisfies the properties $[\overline{X}_i, \overline{X}_j]=[\overline{Z}_i, \overline{Z}_j]=0$ for all i, j=1, . . . , k. In addition, $[\overline{X}_i, \overline{Z}_j]=0$ whenever i≠j, but $\overline{X}_i\overline{Z}_i=-\overline{Z}_i\overline{X}_i$.

Figure 2:
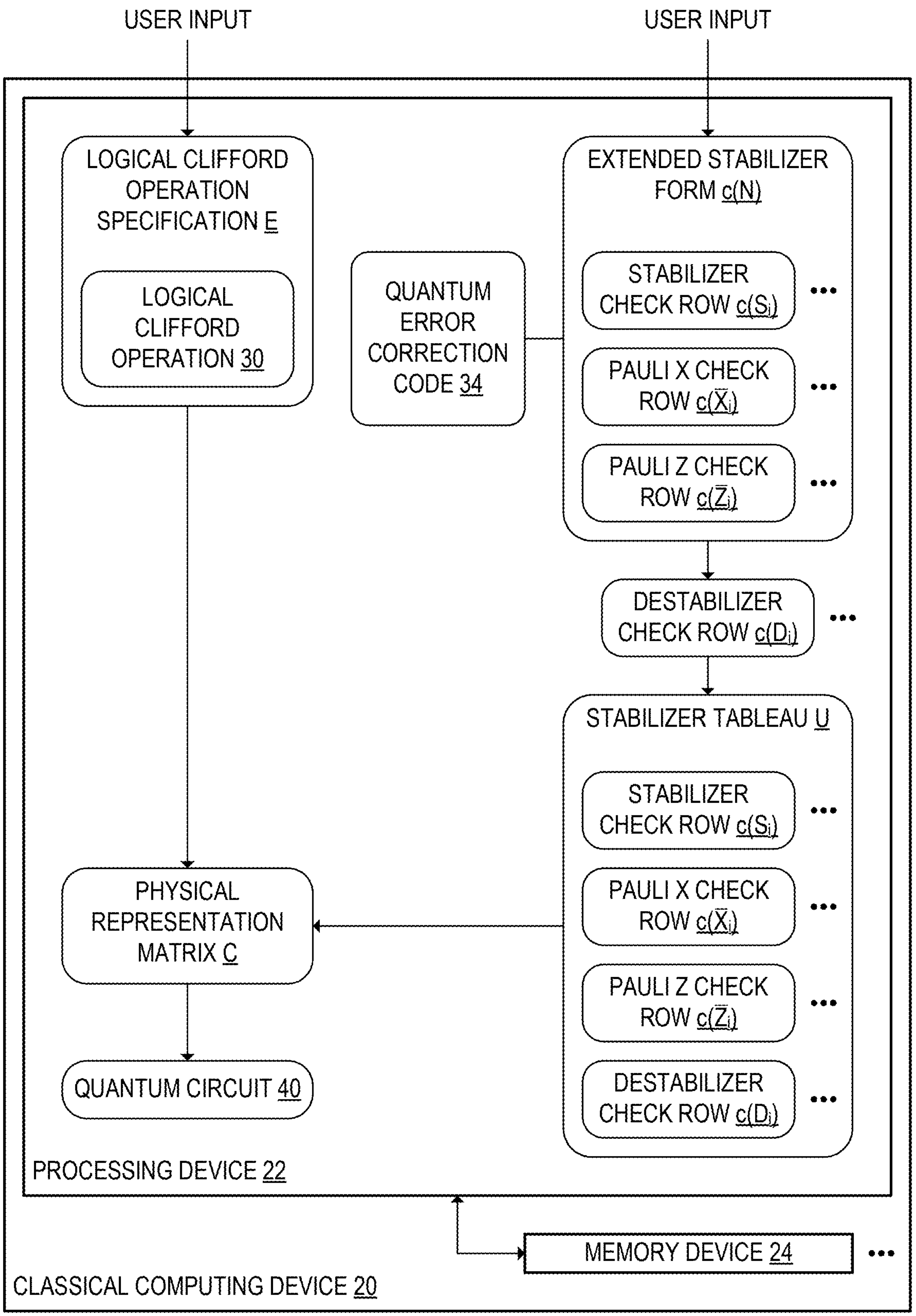
FIG. 2 schematically shows the classical computing device when one or more processing devices are configured to compute a quantum circuit, according to the example of FIG. 1.

FIG. 2 schematically shows the classical computing device 20 when the quantum circuit 40 is computed. As shown in FIG. 2, the one or more processing devices 22 are configured to receive an extended stabilizer form $c(\mathcal{N})$ of a quantum error correction code 34. The extended stabilizer form $c(\mathcal{N})$ is received as an extended check matrix in the example of FIG. 2.

Given a selection of logical Pauli operators, the extended check matrix may be constructed as follows:

$$c(\mathcal{N}) = \begin{pmatrix} S \\ N \end{pmatrix} = \begin{pmatrix} c(S_1) \\ \vdots \\ c(S_{n-k}) \\ c(\overline{X}_1) \\ c(\overline{Z}_1) \\ \vdots \\ c(\overline{X}_k) \\ c(\overline{Z}_k) \end{pmatrix}$$

In the above equation, S is the (n−k)×2n submatrix that corresponds to the stabilizer rows, while N is the 2k×2n submatrix that corresponds to the selection of logical Pauli operators. The extended check matrix is a matrix representation of a linear transformation $$c(\mathcal{N}): \mathbb{F}_2^{2n} \to \mathbb{F}_2^{2n}$$

of rank n+k. As shown in the above equation, the extended stabilizer form includes a plurality of stabilizer check rows $c(S_i)$, a plurality of Pauli X check rows $c(\overline{X}_i)$, and a plurality of Pauli Z check rows $c(\overline{Z}_i)$, and the logical operators are ordered to be consistent with the ordering of the columns of the check matrix $c(\mathcal{S})$.

Given the ordering of the logical operators discussed above, the logical operators have the property $c(X_i)\Lambda_n c(Z_i)=1$ for all i=1, . . . , k. Therefore, the extended check matrix satisfies the following relation:

$$c(\mathcal{N})\Lambda_n c(\mathcal{N})^t = \begin{pmatrix} 0 & 0 \\ 0 & \Lambda_k \end{pmatrix}$$

An example is provided below in which an extended check matrix is computed for the 2×2 Bacon-Shor stabilizer code, viewed as a ⟦4,2,2⟧ stabilizer code. The 2×2 Bacon-Shor stabilizer code has the following stabilizer group:

$$\mathcal{S} = \langle XXXX, ZZZZ\rangle$$

In this example, the logical Pauli operators are selected in a manner that reflects the origin of the 2×2 Bacon-Shor stabilizer code as a subsystem code:

$$\overline{X}_1 = \overline{XI} = XXII$$
$$\overline{Z}_1 = \overline{ZI} = ZIZI$$
$$\overline{X}_2 = \overline{IX} = IXIX$$
$$\overline{Z}_2 = \overline{IZ} = IIZZ$$

In other examples, the logical Pauli operators may be selected according to a different scheme.

In the example of the 2×2 Bacon-Shor stabilizer code, the extended check matrix computed from the code is given by:

$$c(\mathcal{N}) = \begin{pmatrix} 1 & 0 & 1 & 0 & 1 & 0 & 1 & 0 \\ 0 & 1 & 0 & 1 & 0 & 1 & 0 & 1 \\ 1 & 0 & 1 & 0 & 0 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 0 & 0 & 1 & 0 & 1 \end{pmatrix}$$

The rows of the extended check matrix $c(\mathcal{N})$ are $c(S_1)$, $c(S_2)$, $c(\overline{X}_1)$, $c(\overline{Z}_1)$, $c(\overline{X}_2)$, and $c(\overline{Z}_2)$, respectively.

The logical qubits of the 2×2 Bacon-Shor stabilizer code are:

$$|\overline{00}\rangle = \frac{1}{\sqrt{2}}(|0101\rangle + |1111\rangle)$$
$$|\overline{01}\rangle = \frac{1}{\sqrt{2}}(|0101\rangle + |1010\rangle)$$
$$|\overline{10}\rangle = \frac{1}{\sqrt{2}}(|0011\rangle + |1100\rangle)$$
$$|\overline{11}\rangle = \frac{1}{\sqrt{2}}(|0110\rangle + |1001\rangle)$$

The logical state is $|\overline{b_1 b_2}\rangle$, where the bit $b_i$ corresponds to the logical operators $\overline{X}_i$ and $\overline{Z}_i$.

As another example, the extended check matrix is computed for the ⟦8,3,3⟧ code. The ⟦8,3,3⟧ code is a quantum error correction code that encodes three logical qubits with eight physical qubits in a manner in which an operation that maps between encoded states acts on at least three physical qubits. The stabilizer has the following generators:

$$\mathcal{S} = \langle -XXYYZZII,\ -ZZIIXXYY,\ IXZYIXZY,\ -IZYXXYZI,\ -IIZZYYXX \rangle$$

The normalizers are computed using the following logical Pauli operators:

$$\bar{X}_1 = XIIZXZII$$
$$\bar{X}_2 = XIXZIIZI$$
$$\bar{X}_3 = XXIIIZIZ$$
$$\bar{Z}_1 = ZZZZIIII$$
$$\bar{Z}_2 = ZZIIZZII$$
$$\bar{Z}_3 = ZIZIZIZI$$

Using the stabilizers and normalizers in the example of the ⟦8,3,3⟧ code, the extended check matrix may be computed as follows:

$$c(\mathcal{N}) = \begin{pmatrix} 1&0&1&0&1&1&1&1&0&1&0&1&0&0&0&0 \\ 0&1&0&1&0&0&0&0&1&0&1&0&1&1&1&1 \\ 0&0&1&0&0&1&1&1&0&0&1&0&0&1&1&1 \\ 0&0&0&1&1&1&1&0&1&0&1&1&0&1&0&0 \\ 0&0&0&0&0&1&0&1&1&1&1&1&1&0&1&0 \\ 1&0&0&0&0&0&0&1&1&0&0&1&0&0&0&0 \\ 1&0&0&0&1&0&0&1&0&0&0&0&0&1&0&0 \\ 1&0&1&0&0&0&0&0&0&0&0&1&0&0&0&1 \\ 0&1&0&1&0&1&0&1&0&0&0&0&0&0&0&0 \\ 0&1&0&1&0&0&0&0&0&1&0&1&0&0&0&0 \\ 0&1&0&0&0&1&0&0&0&1&0&0&0&1&0&0 \end{pmatrix}$$

In the above equation, the rows of the extended check matrix are $c(S_1)$, $c(S_2)$, $c(S_3)$, $c(S_4)$, $c(S_5)$, $c(\bar{X}_1)$, $c(\bar{Z}_1)$, $c(\bar{X}_2)$, $c(\bar{Z}_2)$, $c(\bar{X}_3)$, and $c(\bar{Z}_3)$, respectively.

Based at least in part on the extended stabilizer form $c(\mathcal{N})$, the one or more processing devices 22 are further configured to compute a stabilizer tableau U of the quantum error correction code 34. As discussed in further detail below, the one or more processing devices 22 may be configured to compute the stabilizer tableau U at least in part by computing a plurality of destabilizer check rows $c(D_i)$ of the quantum error correction code 34 and further extending the extended stabilizer form $c(\mathcal{N})$ with the destabilizer check rows $c(D_i)$.

Destabilizers are defined herein as the Pfaffian partners to the stabilizers, as $\bar{X}_i$ is to $\bar{Z}_i$. Namely, a destabilizer for a generator $S_i$ is a Pauli operator $D_i$ that satisfies the following properties:

1. $D_iD_j=D_jD_i$ for all $j\neq i$,
2. $D_iS_j=S_jD_i$ for all $j\neq i$,
3. $D_iS_i=-S_iD_i$, and
4. $D_i\bar{X}_j=\bar{X}_jD_i$ and $D_i\bar{Z}_j=\bar{Z}_jD_i$ for all $j=1, \ldots, k$.

Similarly to logical Pauli operators, the destabilizers are not uniquely defined. However, the selection of destabilizers depends on the choice of logical operators. For example, $$\bar{X}'_j = \bar{X}_jS_i$$

still represents the logical X operator on the jth qubit. However, $$D_j\bar{X}'_j = D_i\bar{X}_jS_i = -\bar{X}_jS_iD_i = -\bar{X}'_jD_i$$

Therefore, $D_i$ is not a destabilizer at all if $$\bar{X}'_j$$

is chosen as the logical operator.

A set of destabilizers may be computed using the following procedure. The set $\mathcal{D}$ of destabilizers may be initialized as $\mathcal{D}=\emptyset$. Then, for $i=1, \ldots, n-k$, the procedure may further include solving the following equation:

$$\begin{pmatrix} c(\mathcal{N}) \\ c(\mathcal{D}) \end{pmatrix} \Lambda_n d = e_i$$

where $e_i$ is a column vector with a 1 at row i and 0s elsewhere. The above equation has a solution such that $c(D_i)=d^r$, which may be added to the set $\mathcal{D}$ of destabilizers. The above steps may be performed to compute each of the destabilizers $D_i$.

Figure 3:
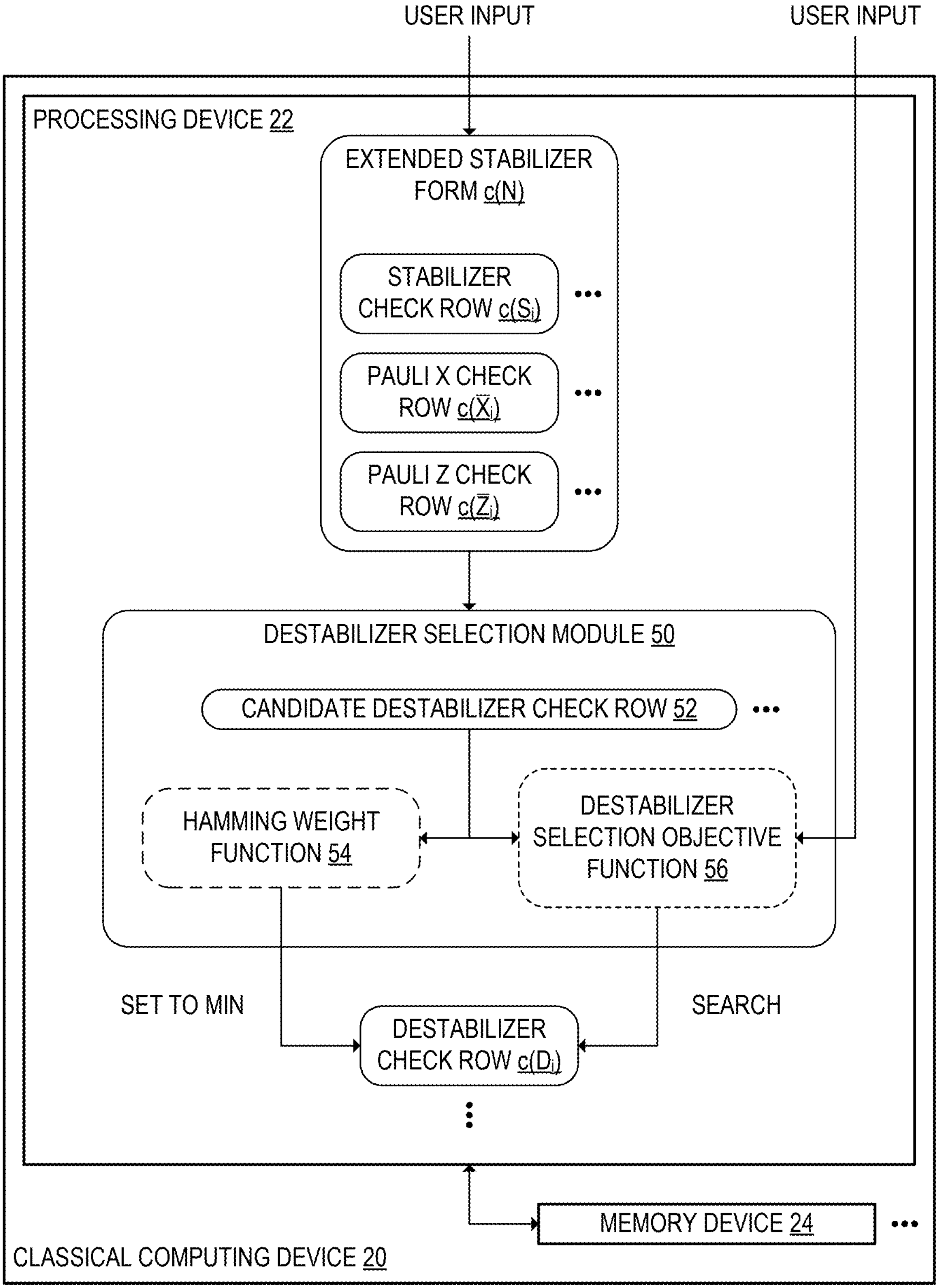
FIG. 3 schematically shows the classical computing device when the one or more processing devices are configured to compute destabilizer check rows, according to the example of FIG. 2.

FIG. 3 schematically shows the classical computing device 20 when the one or more processing devices 22 are configured to compute the destabilizer check rows $c(D_i)$. At each step of the above procedure, there are multiple different choices for d. The one or more processing devices 22 are accordingly configured to execute a destabilizer selection module 50 at which they are configured to compute a plurality of candidate destabilizer check rows 52 based at least in part on the extended stabilizer form $c(\mathcal{N})$.

In some examples, at the destabilizer selection module 50, the one or more processing devices 22 may be configured to apply a Hamming weight function 54 to the candidate destabilizer check rows 52 to compute their respective Hamming weights. Thus, in such examples, the one or more processing devices 22 are configured to select the destabilizer check rows d as lowest-Hamming-weight destabilizer check rows among a plurality of candidate destabilizer check rows 52. Thus, in each iteration, a value of d with minimal Hamming weight may be selected.

In some examples, the one or more processing devices 22 may be further configured to receive a destabilizer selection objective function 56 as a user input. In such examples, the one or more processing devices 22 may be further configured to select the destabilizer check rows d at least in part by searching of the plurality of candidate destabilizer check rows 52 for destabilizer check rows d that approximately maximize or minimize the destabilizer selection objective function 56.

As one example destabilizer selection objective function 56, the one or more processing devices 22 may be configured to use a quantum Hamming weight function. The value of the quantum Hamming weight function is equal to the number of pairs $(x_i, z_i)$ for which $x_i \vee z_i=1$. As another example destabilizer selection objective function 56, the one or more processing devices 22 may be configured to use a function with a first term given by the Hamming weight function 54. A second term of this destabilizer selection objective function 56 may be proportional to the number of is in the candidate destabilizer check row 52 that overlap with is included in previously computed destabilizer check rows $c(D_i)$.

Returning to the example of FIG. 1, the one or more processing devices 22 are further configured to construct the stabilizer tableau U using a set of destabilizers $\mathcal{D}=\{D_1, \ldots, D_{n-k}\}$. The stabilizer tableau U is a further extension of the extended check matrix to include check rows for the destabilizers:

$$U = \begin{pmatrix} c(\mathcal{N}) \\ c(\mathcal{D}) \end{pmatrix} = \begin{pmatrix} S \\ N \\ D \end{pmatrix} = \begin{pmatrix} c(S_i) \\ \vdots \\ c(S_{n-k}) \\ c(\overline{X}_1) \\ c(\overline{Z}_1) \\ \vdots \\ c(\overline{X}_k) \\ c(\overline{Z}_k) \\ c(D_1) \\ \vdots \\ c(D_{n-k}) \end{pmatrix}$$

The stabilizer tableau defines an isomorphism $$U: \mathbb{F}_2^{2n} \to \mathbb{F}_2^{2n}.$$

As in the case of S and N above, D is written as the (n−k)×2n submatrix that corresponds to the check rows of the destabilizers.

An example of stabilizer tableau construction is provided below. In this example, the stabilizer tableau is constructed for the 2×2 Bacon-Shor code discussed above. In this example, a first destabilizer check matrix is given by:

$$c(D_1) = (0\ 0\ 0\ 0\ 0\ 1\ 0\ 0)$$

The first destabilizer check matrix satisfies the following relation:

$$c(\mathcal{N})\Lambda_n c(D_1) = e_1$$

Thus, the first destabilizer is selected as $D_1$=IIZI. By setting $\mathcal{D}=\{D_1\}$, the second destabilizer check matrix may be computed as:

$$c(D_2) = (0\ 1\ 0\ 0\ 0\ 0\ 0\ 0)$$

The second destabilizer check matrix satisfies the following relation:

$$\begin{pmatrix} c(\mathcal{N}) \\ c(\mathcal{D}) \end{pmatrix} \Lambda_n c(D_2) = e_2$$

The second destabilizer is accordingly selected as $D_2$=IIXI, and the full destabilizer set is given by $\mathcal{D}=\{D_1, D_2\}$.

In the above example, the full stabilizer tableau for the 2×2 Bacon-Shor code is given by:

$$U = \begin{pmatrix} 1&0&1&0&1&0&1&0 \\ 0&1&0&1&0&1&0&1 \\ 1&0&1&0&0&0&0&0 \\ 0&1&0&0&0&1&0&0 \\ 0&0&1&0&0&0&1&0 \\ 0&0&0&0&0&1&0&1 \\ 0&0&0&0&0&1&0&0 \\ 0&0&1&0&0&0&0&0 \end{pmatrix}$$

In this stabilizer tableau, the rows are $c(S_1)$, $c(S_2)$, $c(\overline{X}_1)$, $c(\overline{Z}_1)$, $c(\overline{X}_2)$, $c(\overline{Z}_2)$, $c(\overline{D}_1)$, and $c(\overline{D}_2)$ respectively. By construction, the stabilizer tableau has the property $$U\Lambda_n U^t = \begin{pmatrix} 0 & 0 & I_{n-k} \\ 0 & \Lambda_k & 0 \\ I_{n-k} & 0 & 0 \end{pmatrix}$$

In addition, $$U^{-1} = \Lambda_n U^t \begin{pmatrix} 0 & 0 & I_{n-k} \\ 0 & \Lambda_k & 0 \\ I_{n-k} & 0 & 0 \end{pmatrix}$$

In the following example, a stabilizer tableau is constructed for the ⟦8,3,3⟧ code discussed above. Example destabilizers for the ⟦8,3,3⟧ code are provided as follows:

$$D_1 = IIIZIZZI$$

$$D_2 = ZIZIZIIY$$

$$D_3 = ZXYIYIIY$$

$$D_4 = ZYIXZXIY$$

$$D_5 = ZIZIZIZY$$

This set of destabilizers is generated via greedy selection of lowest-Hamming-weight destabilizer at each iteration. Although the ⟦8,3,3⟧ code has a unique choice of the lowest-Hamming-weight destabilizer at each iteration, the choice of a lowest-Hamming-weight destabilizer is not unique in the general case. The stabilizer tableau is equal to:

$$U=\begin{pmatrix}1&0&1&0&1&1&1&1&0&1&0&1&0&0&0&0\\0&1&0&1&0&0&0&0&1&0&1&0&1&1&1&1\\0&0&1&0&0&1&1&1&0&0&1&0&0&1&1&1\\0&0&0&1&1&1&1&0&1&0&1&1&0&1&0&0\\0&0&0&0&0&1&0&1&1&1&1&1&1&0&1&0\\1&0&0&0&0&0&0&1&1&0&0&1&0&0&0&0\\1&0&0&0&1&0&0&1&0&0&0&0&0&1&0&0\\1&0&1&0&0&0&0&0&0&0&0&1&0&0&0&1\\0&1&0&1&0&1&0&1&0&0&0&0&0&0&0&0\\0&1&0&1&0&0&0&0&0&1&0&1&0&0&0&0\\0&1&0&0&0&1&0&0&0&1&0&0&0&1&0&0\\0&0&0&0&0&0&0&1&0&0&0&1&0&1&0&0\\0&1&0&0&0&1&0&0&0&1&0&0&0&0&1&1\\0&1&1&0&1&1&0&0&1&1&0&0&0&0&1&1\\0&1&1&1&0&0&1&0&0&1&1&0&0&0&1&1\\0&1&0&0&0&1&0&0&0&1&0&0&0&1&1&1\end{pmatrix}$$

The rows of the stabilizer tableau are $c(S_1)$, $c(S_2)$, $c(S_3)$, $c(S_4)$, $c(S_5)$, $c(\overline{X}_1)$, $c(\overline{Z}_1)$, $c(\overline{X}_2)$, $c(\overline{Z}_2)$, $c(\overline{X}_3)$, $c(\overline{Z}_3)$, $c(\overline{D}_1)$, $c(\overline{D}_2)$, $c(\overline{D}_3)$, $c(\overline{D}_4)$, and $c(\overline{D}_5)$, respectively.

Instead of treating the stabilizer tableau $$U\colon \mathbb{F}_2^{2n}\to\mathbb{F}_2^{2n}$$

as a linear isomorphism, the stabilizer tableau may instead be used as a change-of-basis matrix on the space $$\mathbb{F}_2^{2n}.$$

This change of basis is symplectic, albeit with a different ordering of the Pfaffian pairs. In the stabilizer tableau U, each stabilizer-de stabilizer pair ($S_i$, $D_i$) is a Pfaffian pair. The stabilizer tableau is accordingly a permuted matrix defining the symplectic form.

In the following discussion, C is defined as a circuit on n physical qubits that implements a local Clifford operation on k logical qubits. The circuit C has the properties $C(\mathcal{S})=\mathcal{S}$ and $C(\mathcal{N})=\mathcal{N}$. The symplectic matrix of the circuit C is also written as C below. The matrix C is a physical representation matrix of the logical Clifford operation E. As discussed in further detail below, the one or more processing devices 22 are configured to compute the physical representation matrix C based at least in part on the stabilizer tableau U and the logical Clifford operation specification E. The one or more processing devices 22 are further configured to output the physical representation matrix C.

For some matrices A, B, and E, the symplectic matrix C has the following property:

$$\begin{pmatrix}S\\N\end{pmatrix}\cdot C=\begin{pmatrix}A&0\\B&E\end{pmatrix}\begin{pmatrix}S\\N\end{pmatrix}$$

Since C also satisfies $C\Lambda_nC^t=\Lambda_n$, the following property also holds:

$$\begin{pmatrix}0&0\\0&\Lambda_k\end{pmatrix}=\begin{pmatrix}S\\N\end{pmatrix}C\Lambda_nC^t(S^t\ N^t)=\begin{pmatrix}A&0\\B&E\end{pmatrix}\begin{pmatrix}0&0\\0&\Lambda_k\end{pmatrix}\begin{pmatrix}A^t&B^t\\0&E^t\end{pmatrix}=\begin{pmatrix}0&0\\0&E\Lambda_kE^t\end{pmatrix}$$

Thus, E is also symplectic. E is the logical Clifford operation specification, expressed as a logical symplectic representation of the logical Clifford operation 30 on the code space. E is therefore known a priori as an input to the computation of the physical representation matrix C.

The action of the stabilizer tableau on the circuit C may be represented as follows:

$$UC=\begin{pmatrix}S\\N\\D\end{pmatrix}\cdot C=\begin{pmatrix}A&0&0\\B&E&0\\R&F&T\end{pmatrix}\begin{pmatrix}S\\N\\D\end{pmatrix}=\begin{pmatrix}A&0&0\\B&E&0\\R&F&T\end{pmatrix}U$$

In the above equation, R, F, and T are matrices that indicate the action of the circuit on the destabilizers. The symplectic representation of the circuit is accordingly given by:

$$C=U^{-1}\begin{pmatrix}A&0&0\\B&E&0\\R&F&T\end{pmatrix}U=\Lambda_n(S^t\ N^t\ D^t)\begin{pmatrix}0&0&I_{n-k}\\0&\Lambda_k&0\\I_{n-k}&0&0\end{pmatrix}\begin{pmatrix}A&0&0\\B&E&0\\R&F&T\end{pmatrix}\begin{pmatrix}S\\N\\D\end{pmatrix}=$$
$$\Lambda_n(S^tRS+S^tFN+S^tTD+N^t\Lambda_kBS+N^t\Lambda_kEN+D^tAS)$$

In addition, $$\begin{pmatrix}0&0&I_{n-k}\\0&\Lambda_k&0\\I_{n-k}&0&0\end{pmatrix}=\begin{pmatrix}A&0&0\\B&E&0\\R&F&T\end{pmatrix}\begin{pmatrix}0&0&I_{n-k}\\0&\Lambda_k&0\\I_{n-k}&0&0\end{pmatrix}\begin{pmatrix}A^t&B^t&R^t\\0&E^t&F^t\\0&0&T^t\end{pmatrix}=$$
$$\begin{pmatrix}0&0&AT^t\\0&E\Lambda_kE^t&E\Lambda_kF^t+BT^t\\TA^t&TB^t+F\Lambda_kE^t&TR^t+F\Lambda_kF^t+RT^t\end{pmatrix}$$

From the equations for $U\Lambda_nU^t$ and UC, the following properties hold:

$$T=A^{-t}$$

$$F=A^{-t}B^tE^{-t}\Lambda_k$$

$$A^{-t}R^t+RA^{-1}=A^{-t}B^tE^{-1}\Lambda_kE^{-1}BA^{-1}$$

where $A^{-t}=(A^{-1})^t=(A^t)^{-1}$. The last of these three properties may be simplified, since E and $E^{-t}$ are both symplectic. Defining $\tilde{R}=A^tR$ allows the last relation to be simplified to:

$$A^{-t}R^t+RA^{-1}=A^{-t}\tilde{R}^tA^{-1}+A^{-t}\tilde{R}A^{-1}=A^{-t}B^t\Lambda_kBA^{-1}$$

and further simplified to:

$$\tilde{R}^t+\tilde{R}=B^t\Lambda_kB$$

Using the above relations, a valid physical representation matrix C of a quantum circuit 40 that implements the logical Clifford operation 30 may be computed using the following matrix values: A=I, B=0, T=I, F=0, and R=0. The physical representation matrix C may accordingly be computed as:

$$C=\Lambda_n(S^tD+N^t\Lambda_kEN+D^tS)$$

Although the above equation for C is simple, the quantum circuit 40 computed from this physical representation matrix C is not guaranteed to have minimum depth or complexity among quantum circuits 40 that implement the logical Clifford operation 30.

Searching over values of A, B, R, T, and F that minimize the depth or complexity of the quantum circuit 40 is an NP-hard problem in the general case. Accordingly, the one or more processing devices 22 may simplify the computation of C using a heuristic approach. Example heuristic approaches that may be used when computing C are shown in FIGS. 4A-4D. The one or more processing devices 22 may be configured to perform each of these approaches at a bit matrix selection module 60. In the examples of FIGS. 4A-4D, the one or more processing devices 22 are configured to set T=I, F=0, and R=0. The approaches of FIGS. 4A-4D instead vary in how A and B are selected. A is an invertible bit matrix and B is an additional bit matrix, which is not limited to being invertible in all examples.

Figure 4A:
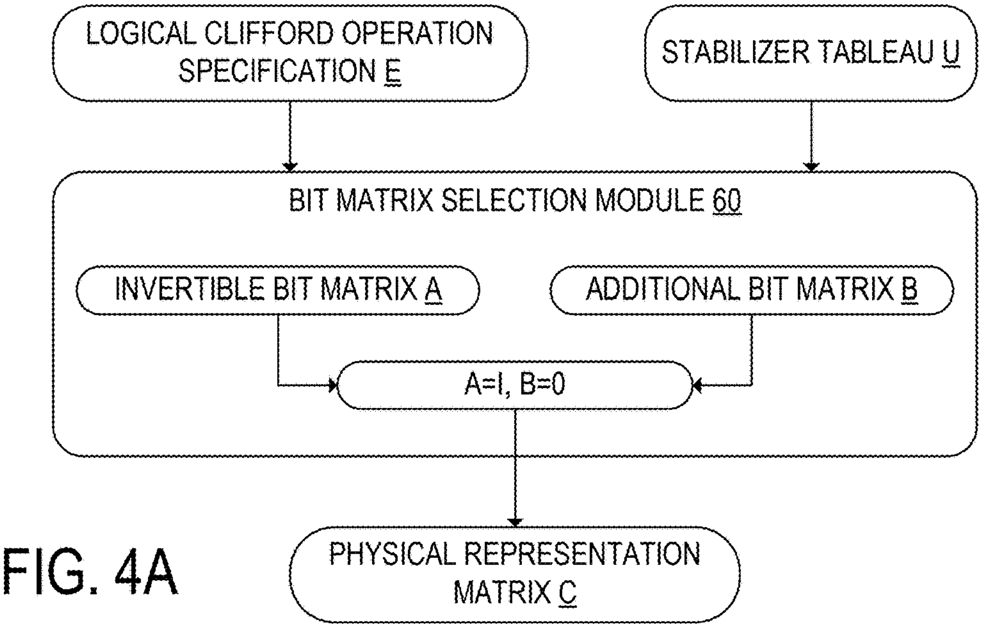
FIGS. 4A-4D schematically show examples of computing a physical representation matrix based at least in part on an invertible bit matrix and an additional bit matrix, according to the example of FIG. 2.

In the example of FIG. 4A, the one or more processing devices 22 are configured to set A=I and B=0, as discussed above.

Figure 4B:
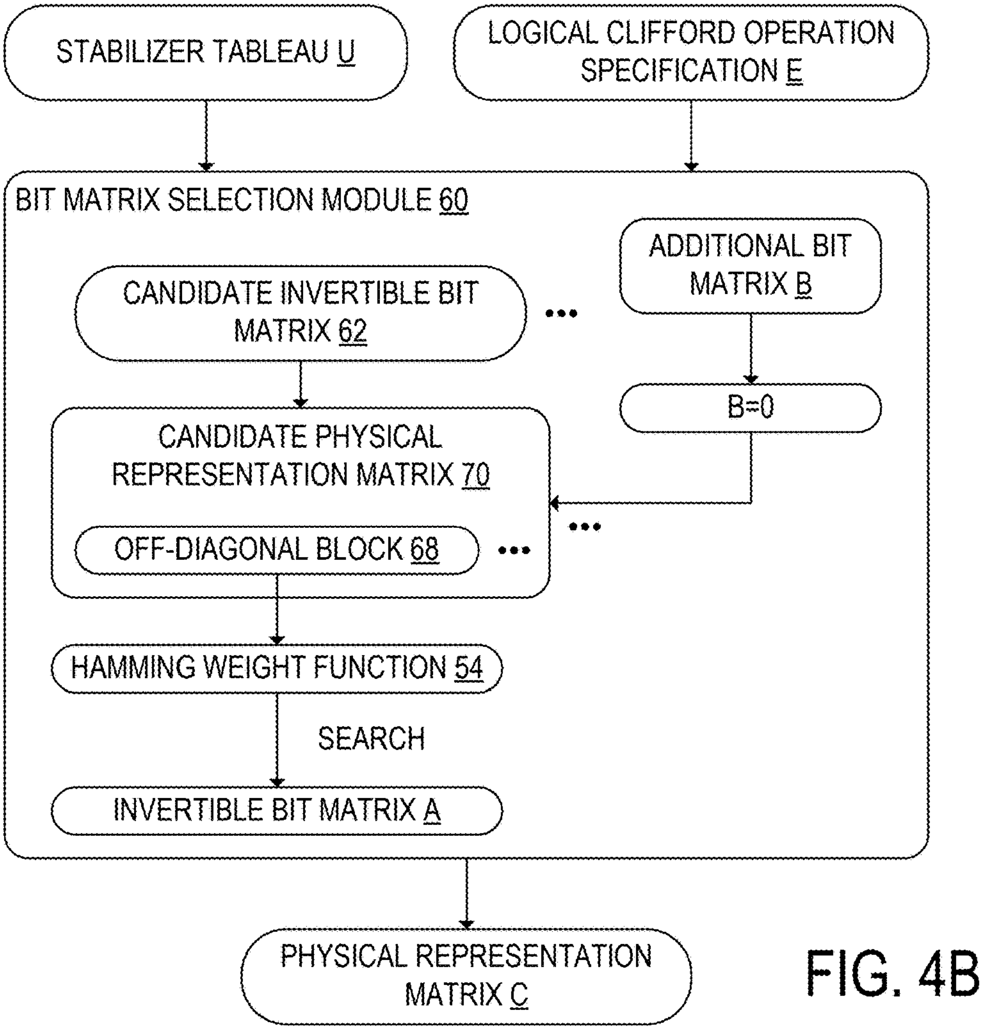

In the example of FIG. 4B, the one or more processing devices 22 are configured to set the additional bit matrix to B=0. In addition, the one or more processing devices 22 are configured to search over respective candidate invertible bit matrices 62. A Hamming weight function 54 is used as the objective function in the example of FIG. 4B, and the one or more processing devices 22 are configured to search for a value of the invertible bit matrix A that approximately minimizes a Hamming weight of off-diagonal blocks 68 of the physical representation matrix C. The one or more processing devices 22 may, for example, identify the invertible bit matrix A that approximately minimizes the Hamming weight by executing a stochastic search algorithm for a predefined number of iterations, or until the stochastic search algorithm has stabilized. The one or more processing devices 22 are configured to perform this search over a space of candidate physical representation matrices 70 that include the off-diagonal blocks 68.

Figure 4C:
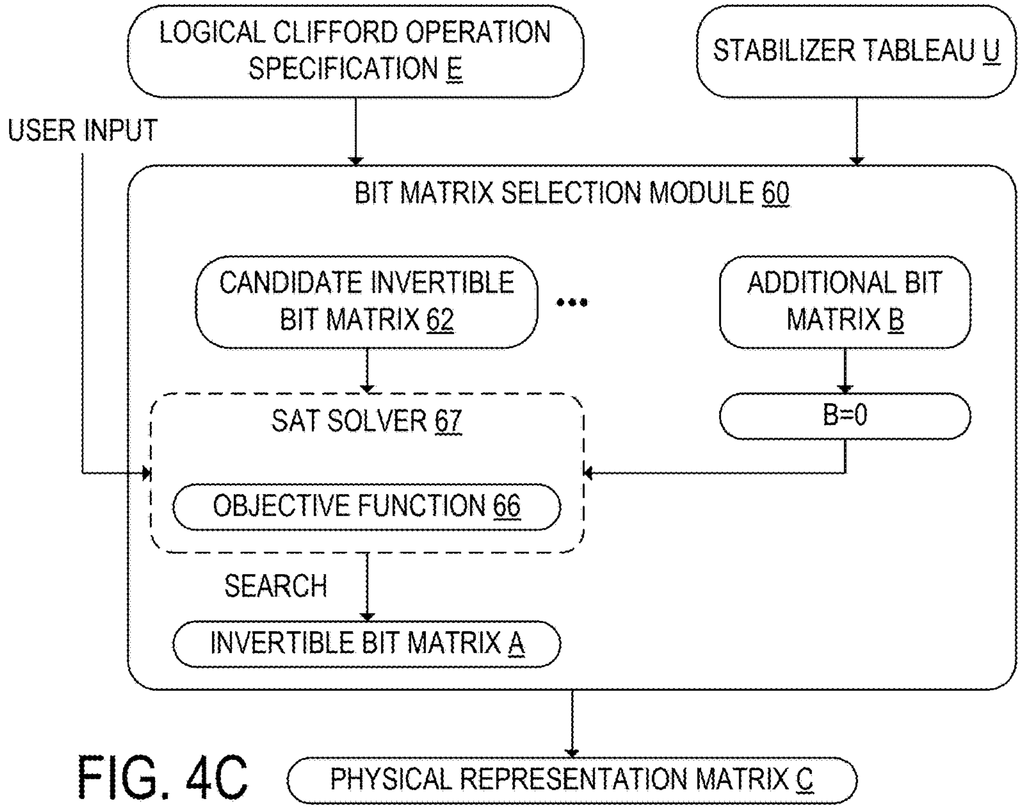

In the example of FIG. 4C, the one or more processing devices 22 are configured to set the additional bit matrix to B=0, as in the example of FIG. 4B. However, rather than using the Hamming weight function 54, the one or more processing devices 22 are further configured to receive an objective function 66 as a user input. The one or more processing devices 22 are further configured to search over respective candidate invertible bit matrices 62 for a value of the invertible bit matrix A that approximately maximizes or minimizes the objective function 66. Accordingly, the user may define a goal for the invertible bit matrix search other than minimizing the Hamming weight of the off-diagonal blocks 68 of physical representation matrix C.

In some examples, the objective function 66 may utilize the properties of 2×2 blocks of the physical representation matrix C. For example, the objective function 66 may be a loss function equal to the quantum Hamming weight of the 2×2 blocks, where the quantum Hamming weight is the number of 2×2 blocks that include at least one nonzero entry. As another example, the objective function 66 may be a loss function equal to the number of 2×2 blocks that are not identity submatrices. Identity submatrices are likely to be included in swap operations, which may be inexpensive compared to other types of operations. Accordingly, this second example objective function 66 may be used in examples in which the cost of a swap operation is negligible.

Figure 4D:
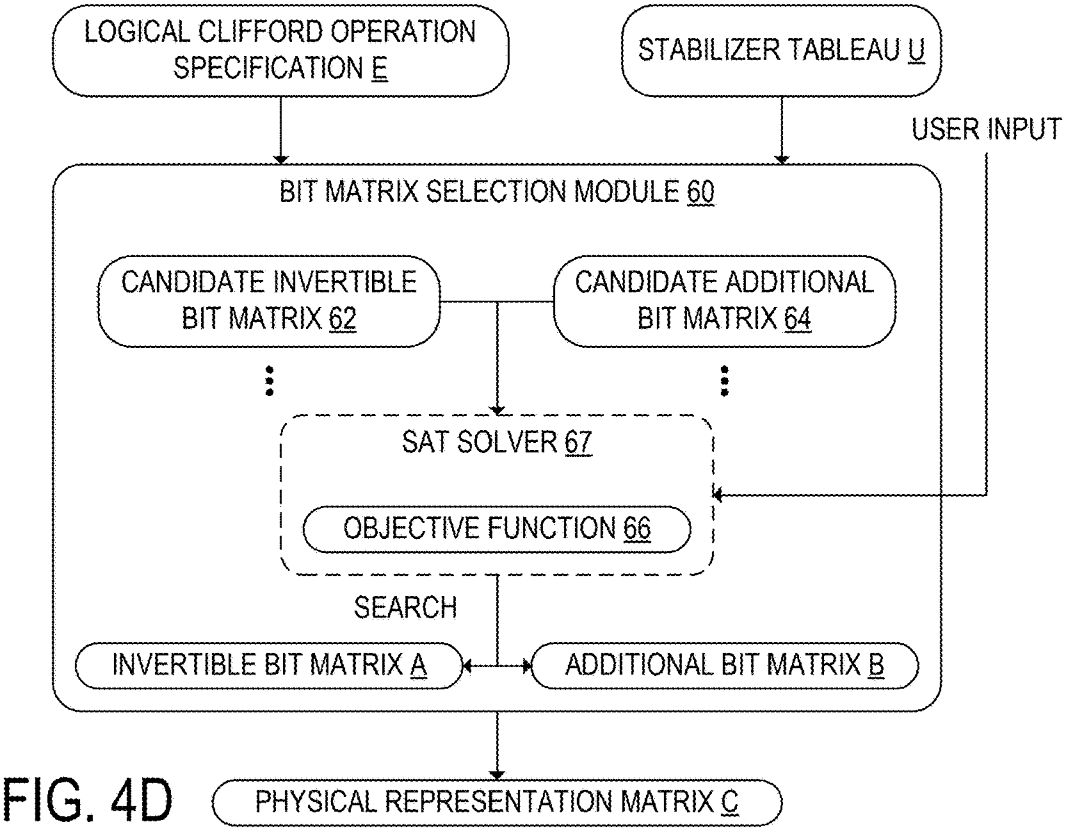

In the example of FIG. 4D, the one or more processing devices 22 are configured to receive an objective function 66 as a user input, as in the example of FIG. 4C. However, rather than setting the additional bit matrix to B=0, the one or more processing devices 22 are further configured to search over respective candidate invertible bit matrices 62 and candidate additional bit matrices 64 for values of the invertible bit matrix A and the additional bit matrix B that approximately maximize or minimize the objective function 66. The approach of FIG. 4D may result in a more efficient quantum circuit 40 due to varying both A and B during the search but may also take longer to converge to values of A and B that achieve that increased efficiency compared to the other approaches discussed above.

In some examples, as shown in FIGS. 4C-4D, the objective function 66 may be included in a SAT solver 67 that the one or more processing devices 22 are configured to receive as user input. In examples in which B=0, as in FIG. 4C, the one or more processing devices 22 may be further configured to exhaustively search over respective candidate invertible bit matrices 62 for a value of the invertible bit matrix A that maximizes or minimizes the objective function 66 of the SAT solver 67. Thus, in such examples, the one or more processing devices 22 may be configured to compute an exact value of the global maximum or minimum of the objective function 66. To compute the global maximum or minimum, the one or more processing devices 22 may be configured to explore the complete search space based at least in part on a symbolic description of matrices A and B. In the example of FIG. 4D, the one or more processing devices 22 may instead be further configured to exhaustively search over respective candidate invertible bit matrices 62 and candidate additional bit matrices 64 for values of the invertible bit matrix A and the additional bit matrix B that maximize or minimize the objective function 66 of the SAT solver 67.

An example computation of the physical representation matrix C is provided below. In this example, C is computed for the 2×2 Bacon-Shor stabilizer code discussed above. In addition, the logical Clifford operation 30 is a logical phase gate on the first logical qubit of the ⟦4,2,2⟧ code. This logical phase gate is denoted as $\overline{S}_1$. According to the Gottesman rules for phase gates, $$\overline{S}_1(X) = Y$$

$$\overline{S}_1(Y) = -X$$

$$\overline{S}_1(Z) = Z$$

The Gottesman rules are encoded in the logical Clifford operation specification E as:

$$E = \begin{pmatrix} 1 & 1 & 0 & 0 \\ 0 & 1 & 0 & 0 \\ 0 & 0 & 1 & 0 \\ 0 & 0 & 0 & 1 \end{pmatrix}$$

The rows of the logical Clifford operation specification E respectively correspond to the following equations:

$$\overline{S}_1(\overline{X}_1) = \overline{Y}_1$$

-continued $$\overline{S}_1(\overline{Z}_1)=\overline{Z}_1$$

$$\overline{S}_1(\overline{X}_2)=\overline{X}_2$$

$$\overline{S}_1(\overline{Z}_2)=\overline{Z}_2$$

Using the matrix values A=I, B=0, T=I, F=0, and R=0, the physical representation matrix C may be computed as follows:

$$C=\begin{pmatrix}1&1&0&0&0&1&0&0\\0&1&0&0&0&0&0&0\\0&0&1&0&0&0&0&0\\0&0&0&1&0&0&0&0\\0&1&0&0&1&1&0&0\\0&0&0&0&0&1&0&0\\0&0&0&0&0&0&1&0\\0&0&0&0&0&0&0&1\end{pmatrix}$$

Dividing the physical representation matrix C into 2×2 blocks, the (1, 1) and (3, 3) diagonal blocks are phase gates. The (1, 3) and (3, 1) blocks are the Gottesman rules for a control-Z gate:

$$CZ(XI)=XZ$$

$$CZ(ZI)=ZI$$

$$CZ(IX)=ZX$$

$$CZ(IZ)=IZ$$

Figure 5A:
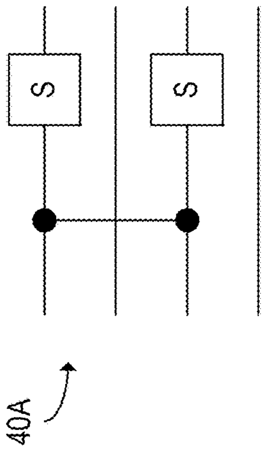
FIGS. 5A-5E schematically show example quantum circuits computed from physical representation matrices, according to the example of FIG. 1.

FIG. 5A schematically shows a quantum circuit 40A that implements the physical representation matrix C of the logical phase gate on the first logical qubit of the ⟦4,2,2⟧ code.

The following example shows the construction of a quantum circuit 40 that implements a logical control-Z gate on the ⟦4,2,2⟧ code, denoted herein as $\overline{CZ}$. Since the ⟦4,2,2⟧ code includes only two logical qubits, and since the control-Z gate is symmetric in its source and target, the ⟦4,2,2⟧ code supports a single logical control-Z gate. The Gottesman rules for the control-Z gate are shown above. The logical Clifford operation specification E for the control-Z gate is given by:

$$E=\begin{pmatrix}1&0&0&1\\0&1&0&0\\0&1&1&0\\0&0&0&1\end{pmatrix}$$

Using the matrix values A=I, B=0, T=I, F=0, and R=0, the physical representation matrix C of the control-Z gate may be computed as:

$$C=\begin{pmatrix}1&0&0&0&0&1&0&1\\0&0&0&0&0&0&0&0\\0&0&1&0&0&0&0&0\\0&0&0&1&0&0&0&0\\0&1&0&0&1&0&0&1\\0&1&0&0&0&1&1&0\\0&1&0&0&0&1&1&0\\0&0&0&0&0&0&0&1\end{pmatrix}$$

The above physical representation matrix C shows that three physical control-Z operations may be performed to implement the logical control-Z gate, modulo possible Pauli gates. The physical control-Z gate may accordingly be implemented with the quantum circuit 40B shown in FIG. 5B.

Figure 5B:
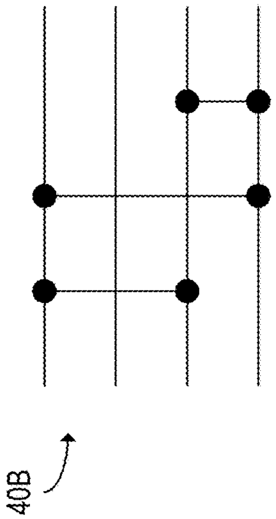

Although the quantum circuit 40B of FIG. 5B can be used to implement the logical control-Z gate, a simpler implementation of the logical control-Z gate is also possible. In the equation shown above for the symplectic representation of C, a simpler quantum circuit may instead be obtained by using the following matrix values:

$$A=\begin{pmatrix}1&1\\0&1\end{pmatrix}$$

$$B=F=R=0$$

$$T=\begin{pmatrix}1&0\\1&1\end{pmatrix}$$

These matrix values result in the following physical representation matrix:

$$C=\begin{pmatrix}1&0&0&0&0&0&0&1\\0&1&0&0&0&0&0&0\\0&0&1&0&0&1&0&0\\0&0&0&1&0&0&0&0\\0&0&0&1&1&0&0&0\\0&0&0&0&0&1&0&0\\0&1&0&0&0&0&1&0\\0&0&0&0&0&0&0&1\end{pmatrix}$$

Figure 5C:
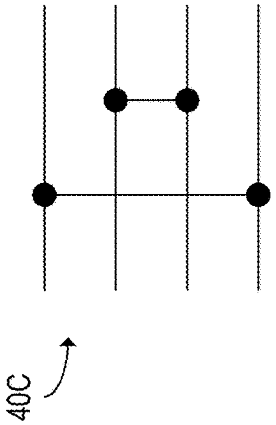

This physical representation matrix C corresponds to the quantum circuit 40C of FIG. 5C, which includes two physical control-Z gates instead of three. Although the quantum circuit 40C is shown in FIG. 5C with depth two for readability, the physical control-Z gates included in the quantum circuit 40C may be implemented concurrently.

In the following example, a quantum circuit 40 is computed that implements a CNOT gate on the ⟦8,3,3⟧ code between the first two qubits, with the first qubit as the control and the second qubit as the target. This CNOT gate is denoted herein as $\overline{\text{CNOT}}_{1,2}$. The Gottesman rules for a CNOT gate (where the first qubit is the control and the second is the target) are:

$$CNOT(XI)=XX$$

$$CNOT(ZI)=ZI$$

$$CNOT(IX)=IX$$

$$CNOT(IZ)=ZZ$$

The third logical qubit of the ⟦8,3,3⟧ code is unaffected.

The Gottesman rules for the $\overline{\text{CNOT}}_{1,2}$ gate may be expressed as the following logical Clifford operation specification:

$$E = \begin{pmatrix} 1 & 0 & 1 & 0 & 0 & 0 \\ 0 & 1 & 0 & 0 & 0 & 0 \\ 0 & 0 & 1 & 0 & 0 & 0 \\ 0 & 1 & 0 & 1 & 0 & 0 \\ 0 & 0 & 0 & 0 & 1 & 0 \\ 0 & 0 & 0 & 0 & 0 & 1 \end{pmatrix}$$

The physical representation matrix C can then be computed as:

$$C = \begin{pmatrix} 0&0&0&0&1&0&0&1&0&0&0&0&0&1&0&0 \\ 0&0&0&1&0&1&0&1&0&0&0&0&0&0&0&0 \\ 1&0&1&0&1&0&0&1&0&0&0&0&0&1&0&0 \\ 0&0&0&1&0&0&0&0&0&0&0&0&0&0&0&0 \\ 1&0&0&0&0&0&0&1&0&0&0&0&0&1&0&0 \\ 0&1&0&1&0&0&0&1&0&0&0&0&0&0&0&0 \\ 1&1&0&1&1&1&1&0&0&0&0&0&0&1&0&0 \\ 0&0&0&0&0&0&0&1&0&0&0&0&0&0&0&0 \\ 0&0&0&0&0&0&0&0&1&0&0&0&0&0&0&0 \\ 0&0&0&0&0&0&0&0&0&1&0&0&0&0&0&0 \\ 0&0&0&0&0&0&0&0&0&0&1&0&0&0&0&0 \\ 0&0&0&0&0&0&0&0&0&0&0&1&0&0&0&0 \\ 0&1&0&1&0&1&0&1&0&0&0&0&1&0&0&0 \\ 0&0&0&0&0&0&0&0&0&0&0&0&0&1&0&0 \\ 0&0&0&0&0&0&0&0&0&0&0&0&0&0&1&0 \\ 0&0&0&0&0&0&0&0&0&0&0&0&0&0&0&1 \end{pmatrix}$$

Figure 5D:
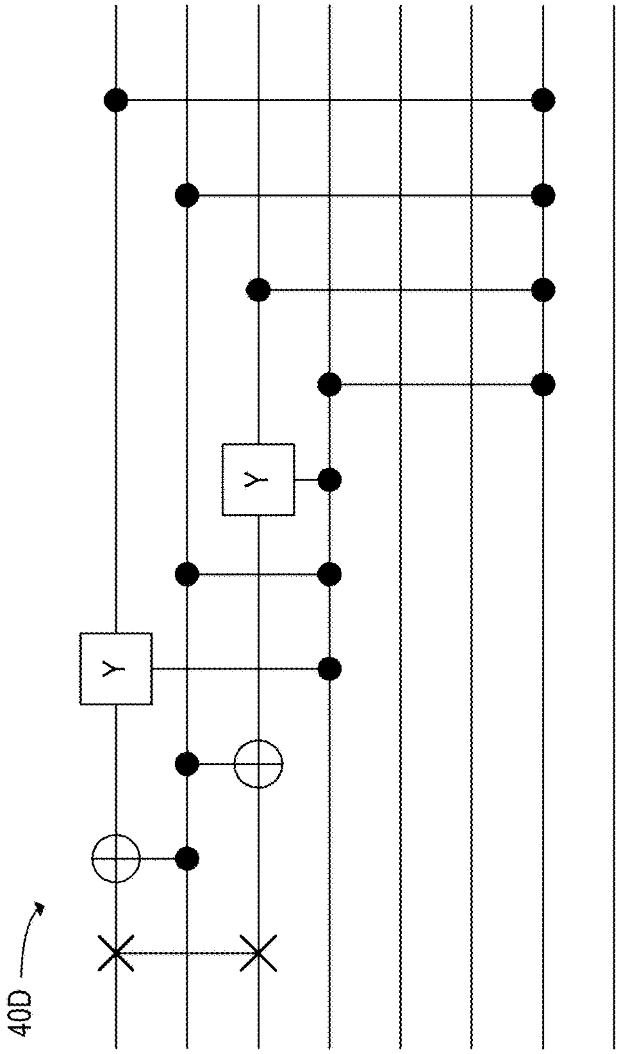

The above physical representation matrix C may be reduced using two-qubit gates to obtain the quantum circuit 40D (modulo possible Pauli gates) schematically depicted in FIG. 5D.

As in the previous example, the quantum circuit 40D is not maximally efficient in terms of its number of off-diagonal nonzero 2×2 blocks. The number of off-diagonal nonzero 2×2 blocks corresponds to the number of physical two-qubit gates that are used to implement the logical operation. By enumerating over possible values of A while holding B=0, a lower-Hamming-weight physical representation matrix may be computed with $$A = \begin{pmatrix} 1 & 0 & 0 & 0 & 0 \\ 0 & 0 & 0 & 0 & 1 \\ 0 & 0 & 1 & 0 & 0 \\ 0 & 0 & 0 & 1 & 0 \\ 0 & 1 & 0 & 0 & 0 \end{pmatrix}$$

The physical representation matrix C is equal to:

$$C = \begin{pmatrix} 0&0&0&0&1&0&0&1&0&0&0&0&0&0&0&0 \\ 0&0&0&1&0&1&0&1&0&0&0&0&0&0&0&0 \\ 1&0&1&0&1&0&0&1&0&0&0&0&0&0&0&0 \\ 0&0&0&1&0&0&0&0&0&0&0&0&0&0&0&0 \\ 1&0&0&0&0&0&0&1&0&0&0&0&0&0&0&0 \\ 0&1&0&1&0&0&0&1&0&0&0&0&0&0&0&0 \\ 1&1&0&1&1&1&1&0&0&0&0&0&0&0&0&0 \\ 0&0&0&0&0&0&0&1&0&0&0&0&0&0&0&0 \\ 0&0&0&0&0&0&0&0&1&0&0&0&0&1&0&0 \\ 0&0&0&0&0&0&0&0&0&1&0&0&0&0&0&0 \\ 0&0&0&0&0&0&0&0&0&0&1&0&0&1&0&0 \\ 0&0&0&0&0&0&0&0&0&0&0&1&0&0&0&0 \\ 0&0&0&0&0&0&0&0&0&1&0&1&1&0&0&1 \\ 0&0&0&0&0&0&0&0&0&0&0&0&0&1&0&0 \\ 0&0&0&0&0&0&0&0&0&0&0&0&0&1&1&0 \\ 0&0&0&0&0&0&0&0&0&0&0&0&0&0&0&1 \end{pmatrix}$$

Figure 5E:
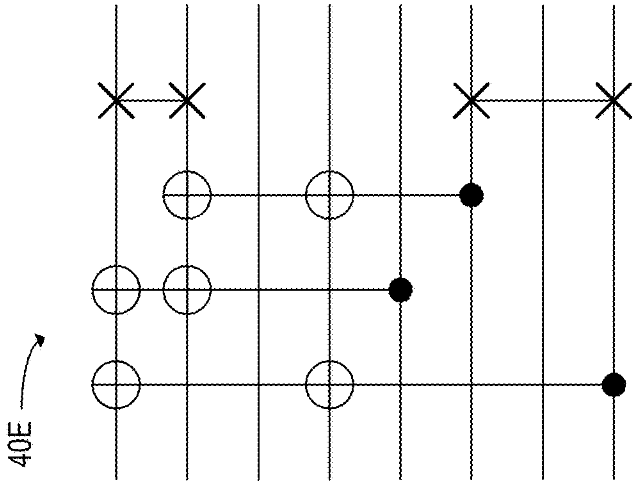

The above physical representation matrix C may be reduced to two-qubit gates to obtain the quantum circuit 40E (modulo possible Pauli gates) schematically depicted in FIG. 5E.

Figure 6A:
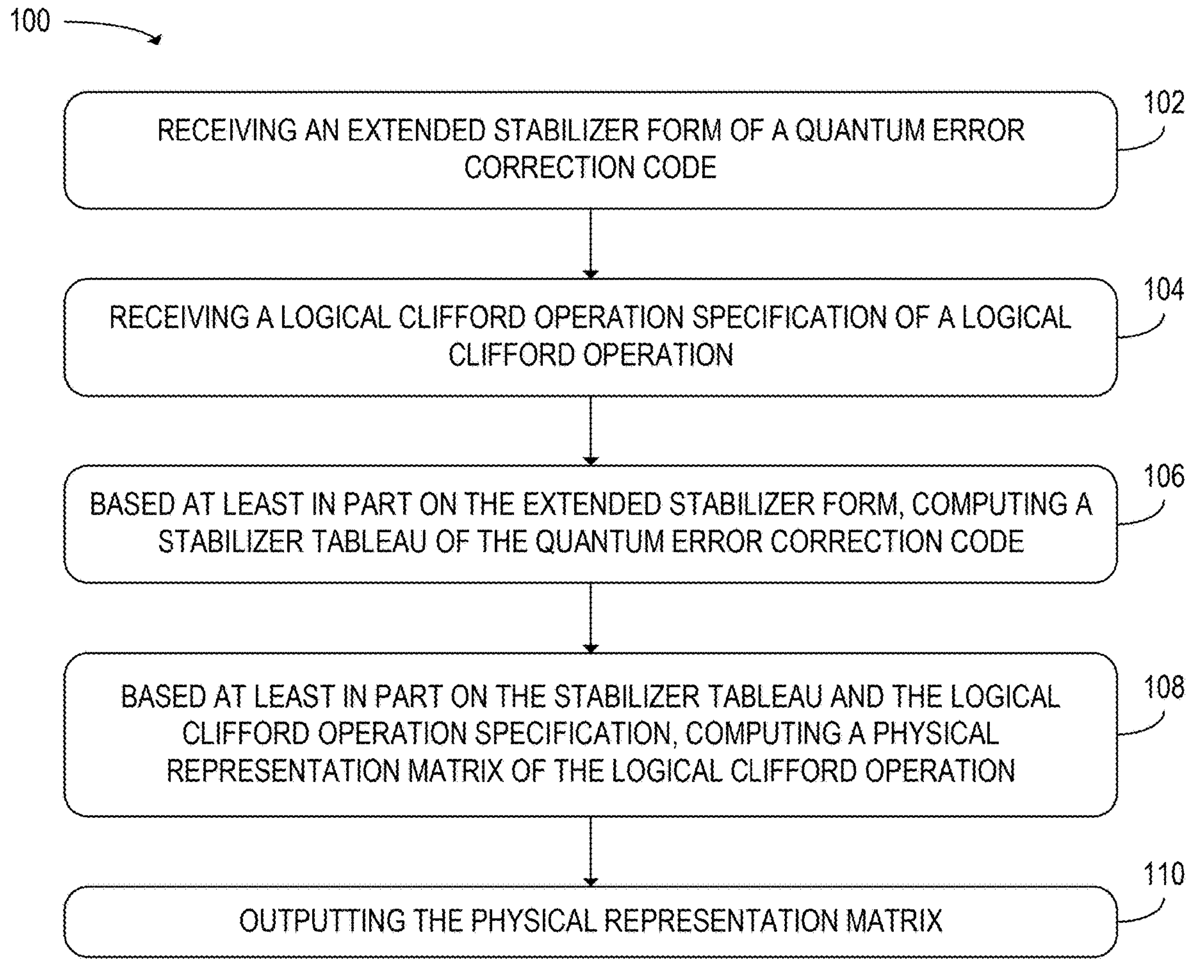
FIG. 6A shows a flowchart of a method for use with a computing system to determine a physical representation matrix of a logical Clifford operation, according to the example of FIG. 1.

FIG. 6A shows a flowchart of a method 100 for use with a computing system to determine a physical representation matrix of a logical Clifford operation. At step 102, the method 100 includes receiving an extended stabilizer form of a quantum error correction code. In the extended stabilizer form, the quantum error correction code is represented as an extended check matrix. The extended check matrix is a binary matrix including rows that correspond to stabilizers of the quantum error correction code and rows that correspond to logical Pauli operators.

At step 104, the method 100 further includes receiving a logical Clifford operation specification of a logical Clifford operation. The logical Clifford operation specification is a binary matrix and is expressed as a logical symplectic representation of the Clifford operation on the code space.

At step 106, based at least in part on the extended stabilizer form, the method 100 further includes computing a stabilizer tableau of the quantum error correction code. The stabilizer tableau is a change-of-basis matrix on the space of 2n×2n binary matrices.

At step 108, the method 100 further includes computing a physical representation matrix of the logical Clifford operation based at least in part on the stabilizer tableau and the logical Clifford operation specification. The physical representation matrix is a symplectic matrix that encodes a mapping between the logical Clifford operation and a set of operations on physical qubits that may be used to implement that logical Clifford operation. At step 110, the method 100 further includes outputting the physical representation matrix.

Figure 6B:
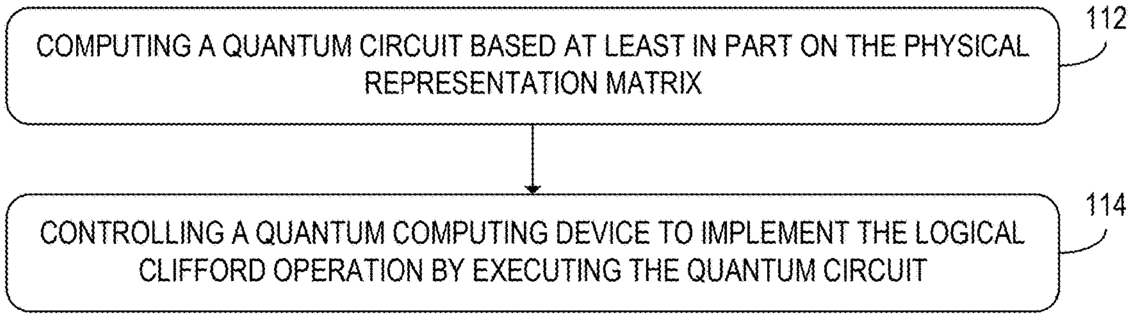
FIG. 6B shows additional steps of the method of FIG. 6A that may be performed subsequently to computing the physical representation matrix.

FIG. 6B shows additional steps of the method 100 of FIG. 6A that may be performed subsequently to computing the physical representation matrix. At step 112, the method 100 may further include computing a quantum circuit based at least in part on the physical representation matrix. The quantum circuit includes the specific quantum gates that may be performed on the physical qubits to implement the logical Clifford operation.

At step 114, the method 100 may further include controlling a quantum computing device to implement the logical Clifford operation by executing the quantum circuit. Step 114 may include converting the quantum circuit into control instructions and transmitting those control instructions to the quantum computing device.

Figure 6C:
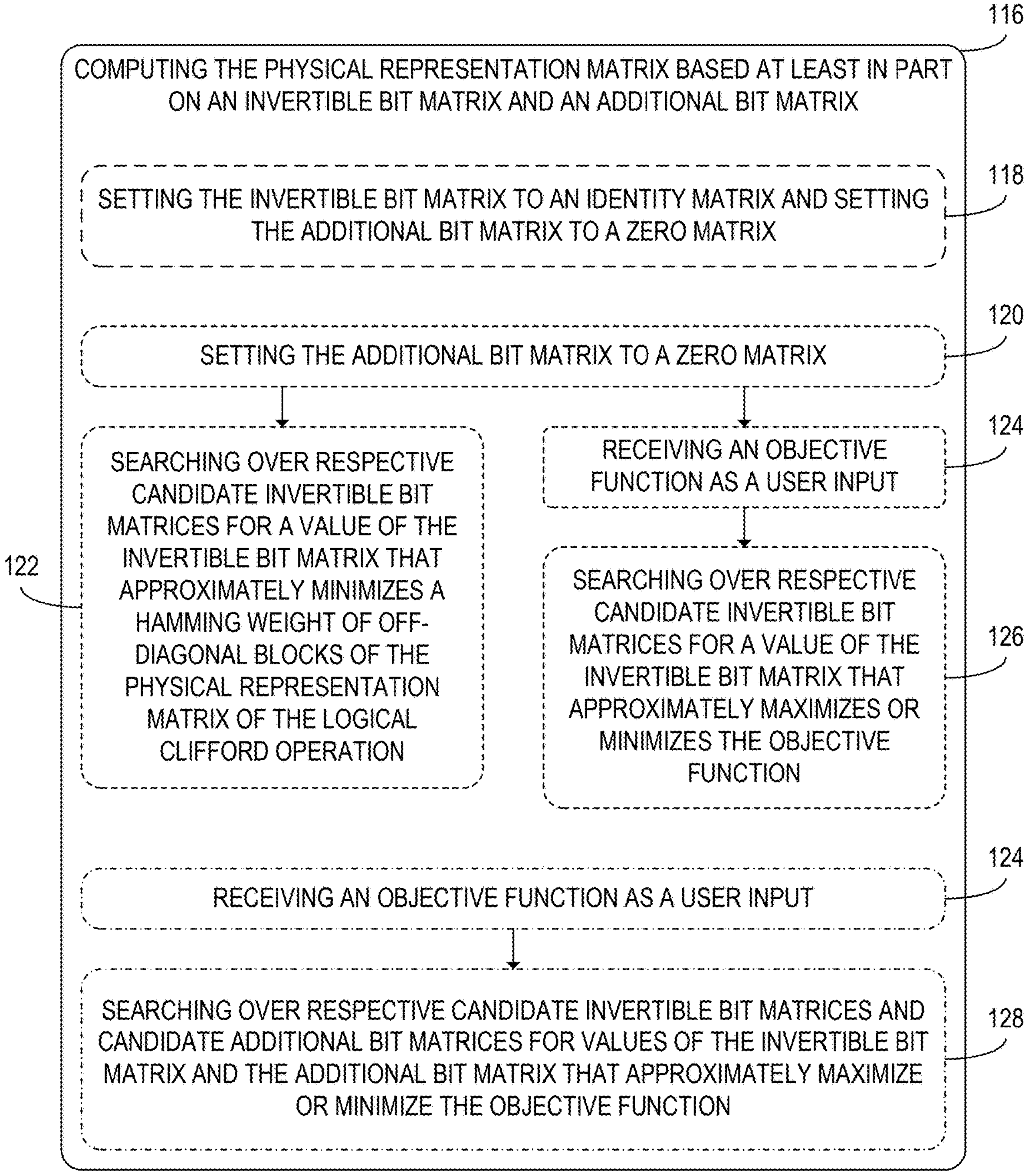
FIG. 6C shows additional steps of the method of FIG. 6A that may be performed when computing the physical representation matrix.

FIG. 6C shows additional steps of the method 100 that may be performed when computing the physical representation matrix at step 108. At step 116, step 108 may include computing the physical representation matrix based at least in part on an invertible bit matrix and an additional bit matrix.

FIG. 6C further shows example approaches by which the invertible bit matrix and the additional bit matrix may be selected. In some examples, at step 118, step 116 may include setting the invertible bit matrix to an identity matrix and setting the additional bit matrix to a zero matrix.

In other examples, step 116 may include, at step 120, setting the additional bit matrix to a zero matrix without setting the invertible bit matrix to an identity matrix. In such examples, step 116 may further include, at step 122, computing the physical representation matrix includes searching over respective candidate invertible bit matrices for a value of the invertible bit matrix that approximately minimizes a Hamming weight of the physical representation matrix of the logical Clifford operation.

In other examples in which the additional bit matrix is set to a zero matrix at step 120, step 116 may further include, at step 124, receiving an objective function as a user input. The objective function specifies a quantity to minimize or maximize. In such examples, at step 126, step 116 may further include searching over respective candidate invertible bit matrices for a value of the invertible bit matrix that approximately maximizes or minimizes the objective function. For example, step 126 may include executing a stochastic search algorithm to estimate the maximum or minimum of the objective function.

In other examples, step 116 may include receiving an objective function as a user input at step 124, but without setting the additional bit matrix to a zero matrix. In such examples, step 116 may further include, at step 128, searching over respective candidate invertible bit matrices and candidate additional bit matrices for values of the invertible bit matrix and the additional bit matrix that approximately maximize or minimize the objective function.

In some examples, the objective function or the Hamming weight function may be included in a SAT solver that is received as user input. In such examples, rather than computing the invertible bit matrix as a value that approximately maximizes or minimizes the Hamming weight function or the objective function, the invertible bit matrix may be computed at the SAT solver as a value that exactly maximizes or minimizes that function. This value of the invertible bit matrix may be identified through an exhaustive search. In examples in which the additional bit matrix is not fixed as a zero matrix, the value of the additional bit matrix when the Hamming weight function or objective function is maximized or minimized may also be computed at the SAT solver.

Figure 6D:
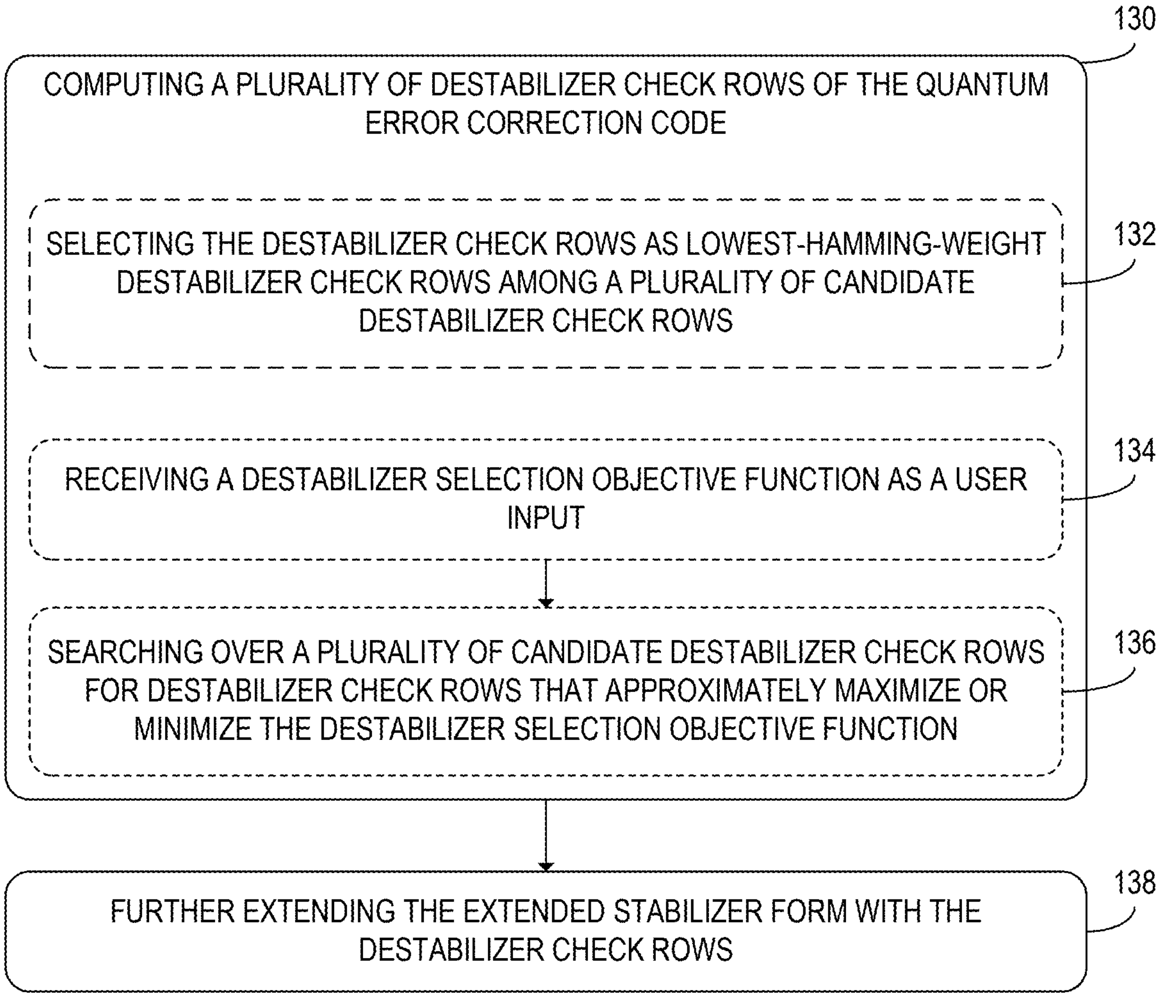
FIG. 6D shows additional steps of the method of FIG. 6A that may be performed when computing a stabilizer tableau.

FIG. 6D shows additional steps of the method 100 that may be performed when computing the stabilizer tableau at step 106. At step 130, step 106 may include computing a plurality of destabilizer check rows of the quantum error correction code. The destabilizers are Pfaffian partners to the stabilizers, and the destabilizer check rows are binary representations of the destabilizers.

In some examples, computing the destabilizer check rows may include, at step 132, selecting the destabilizer check rows as lowest-Hamming-weight destabilizer check rows among a plurality of candidate destabilizer check rows. The destabilizer check rows may be iteratively computed, and the lowest-Hamming-weight destabilizer check row may be greedily selected at each iteration.

As an alternative to step 132, step 130 may instead include steps 134 and 136. At step 134, step 130 may include receiving a destabilizer selection objective function as a user input. At step 136, step 130 may further include selecting the destabilizer check rows at least in part by searching over a plurality of candidate destabilizer check rows for destabilizer check rows that approximately maximize or minimize the destabilizer selection objective function. Accordingly, step 136 may include identifying destabilizer check rows that approximately maximize or minimize the destabilizer selection objective function.

At step 138, computing the stabilizer tableau at step 106 may further include further extending the extended stabilizer form with the destabilizer check rows. Accordingly, the stabilizer tableau includes rows corresponding to the stabilizers, the logical Pauli operators, and the destabilizers of the quantum error correction code.

The following discussion provides the asymptotic computational complexity of the above techniques for computing the physical representation matrix. In addition, the following discussion compares the above techniques to the symplectic transvectant method, an existing approach to computing the physical representation matrix of a logical Clifford operator. With both techniques, when computing the physical matrix representation, the matrices are binary and often sparse. Accordingly, the computational complexity analysis provided below makes the following assumptions about matrix operation complexity:

A vector-matrix multiplication has a cost of $O(n)$, where n is the length of the vector. This cost is the cost of recording the product.

A matrix-matrix multiplication has a cost of $O(n^2)$, which is also the cost of recording the product.

Solving a system of linear equations has a cost of $O(n^2)$, which is the cost of recording the system to be solved.

In the symplectic transvectant method, an outer loop has length $t=n-k$, where n is the number of physical qubits and k is the number of logical qubits. The outer loop accordingly has a length of $O(n)$.

At each step of the outer loop, the symplectic transvectant method includes computing a vector-matrix product $\tilde{x}_i=F_{i-1}x_i$, which has a cost of at least $O(n)$.

The symplectic transvectant method then branches into two cases:

In a first case in which $\rangle \tilde{x}_i, y_i \langle =1$, the symplectic transvectant method includes computing a matrix-matrix product $F_i=F_{i-1}F_{h_i}$, which costs at least $O(n^2)$.

In a second case in which $\rangle \tilde{x}_i, y_i \langle =0$, the symplectic transvectant method includes searching for a vector $w_i$, which includes solving a system of linear equations at a cost of at least $O(n^2)$. This branch further includes computing a matrix-matrix product $F_i=F_{i-1}F_{h_{i1}}F_{h_{i2}}$, which has a cost of at least $O(n^2)$.

Since the symplectic transvectant method includes at least one cost $O(n^2)$ step within each iteration of a loop with length $O(n)$, the symplectic transvectant method has a computational complexity of at least $O(n^3)$. The symplectic transvectant method incurs this cost every time a physical representation matrix is computed for a logical Clifford operator.

The extended stabilizer method discussed herein includes two phases. After the first phase has been performed once, the second phase can be performed one or more times to compute one or more respective physical representations of corresponding logical Clifford operators In the first phase, the extended stabilizer method includes computing the destabilizers. There are $O(n)$ destabilizers, each of which is computed by solving a system of linear equations. The first phase accordingly has a computational complexity of $O(n^3)$.

The second phase includes computing the physical representation matrix using the stabilizer tableau and the logical Clifford operation specification. Since this phase includes matrix-matrix products, it has a computational complexity of $O(n^2)$.

As shown in the above discussion of asymptotic computational complexity, the extended stabilizer method discussed herein has a lower computational complexity than the symplectic transvectant method when multiple physical representation matrices are computed for a given error correction code. The symplectic transvectant method includes an $O(n^3)$ process for each physical representation matrix. In contrast, the extended stabilizer method includes an initial $O(n^3)$ phase, followed by a respective $O(n^2)$ for each physical representation matrix. The extended stabilizer method may accordingly compute the physical representation matrices more efficiently than the symplectic transvectant method.

The methods and processes described herein are tied to a computing system of one or more computing devices. In particular, such methods and processes can be implemented as a computer-application program or service, an application-programming interface (API), a library, and/or other computer-program product.

Figure 7:
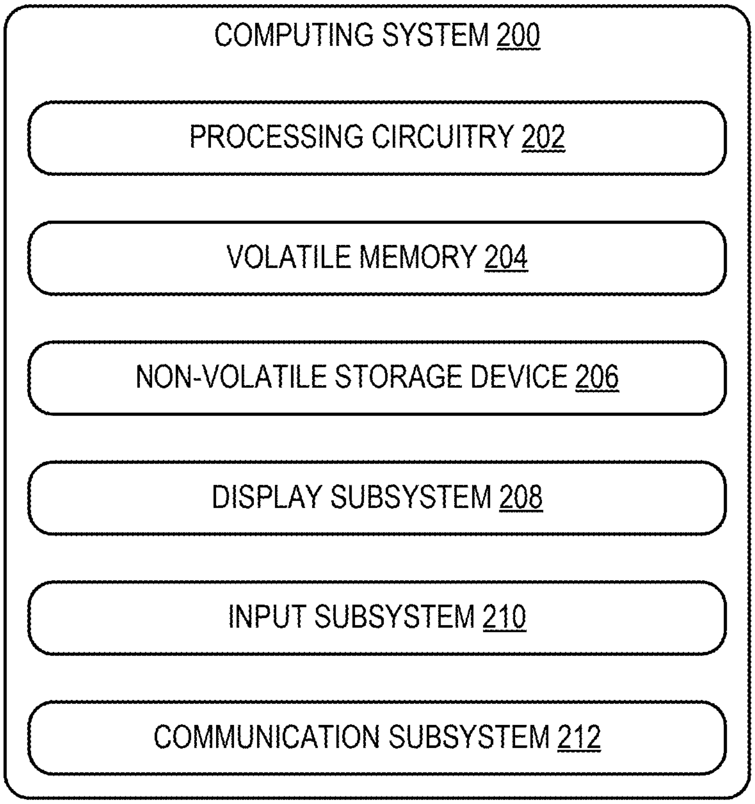
FIG. 7 shows a schematic view of an example computing environment in which the computing system of FIG. 1 may be instantiated.

FIG. 7 schematically shows a non-limiting embodiment of a computing system 200 that can enact one or more of the methods and processes described above. Computing system 200 is shown in simplified form. Computing system 200 may embody the computing system 1 described above and illustrated in FIG. 1. Components of computing system 200 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 200 includes processing circuitry 202, volatile memory 204, and a non-volatile storage device 206. Computing system 200 may optionally include a display subsystem 208, input subsystem 210, communication subsystem 212, and/or other components not shown in FIG. 7.

Processing circuitry 202 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 202 may be single-core or multi-core, and the instructions executed thereon may be configured for sequential, parallel, and/or distributed processing. Individual components of the processing circuitry 202 optionally may be distributed among two or more separate devices, which may be remotely located and/or configured for coordinated processing. For example, aspects of the computing system 200 disclosed herein may be virtualized and executed by remotely accessible, networked computing devices configured in a cloud-computing configuration. In such a case, these virtualized aspects are run on different physical logic processors of various different machines. These different physical logic processors of the different machines will be understood to be collectively encompassed by processing circuitry 202.

Non-volatile storage device 206 includes one or more physical devices configured to hold instructions executable by the processing circuitry to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by processing circuitry 202 to temporarily store information during processing of software instructions. It will be appreciated that volatile memory 204 typically does not continue to store instructions when power is cut to the volatile memory 204.

Aspects of processing circuitry 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via processing circuitry 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with processing circuitry 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, camera, or microphone.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem 212 may be configured for communication via a wired or wireless local- or wide-area network, broadband cellular network, etc. In some embodiments, the communication subsystem 212 may allow computing system 200 to send and/or receive messages to and/or from other devices via a network such as the Internet.

The following paragraphs discuss several aspects of the present disclosure. According to one aspect of the present disclosure, a computing system is provided, including one or more processing devices configured to receive an extended stabilizer form of a quantum error correction code. The one or more processing devices are further configured to receive a logical Clifford operation specification of a logical Clifford operation. Based at least in part on the extended stabilizer form, the one or more processing devices are further configured to compute a stabilizer tableau of the quantum error correction code. Based at least in part on the stabilizer tableau and the logical Clifford operation specification, the one or more processing devices are further configured to compute a physical representation matrix of the logical Clifford operation. The one or more processing devices are further configured to output the physical representation matrix. The above features may have the technical effect of efficiently computing a physical representation matrix of a logical Clifford operation according to a quantum error correction code.

According to this aspect, the one or more processing devices may be further configured to compute a quantum circuit based at least in part on the physical representation matrix. The one or more processing devices may be further configured to control a quantum computing device to implement the logical Clifford operation by executing the quantum circuit. The above features may have the technical effect of performing the logical Clifford operation at the quantum computing device.

According to this aspect, the one or more processing devices may be further configured to compute the physical representation matrix based at least in part on an invertible bit matrix and an additional bit matrix. The above features may have the technical effect of defining parameters with which the physical representation matrix is computed.

According to this aspect, the invertible bit matrix may be an identity matrix, and the additional bit matrix may be a zero matrix. The above features may have the technical effect of allowing the one or more processing devices to compute the physical representation matrix in a low-complexity manner.

According to this aspect, the additional bit matrix may be a zero matrix. The one or more processing devices may be configured to search over respective candidate invertible bit matrices for a value of the invertible bit matrix that approximately minimizes a Hamming weight of off-diagonal blocks of the physical representation matrix of the logical Clifford operation. The above features may have the technical effect of computing a low-Hamming-weight physical representation matrix.

According to this aspect, the additional bit matrix may be a zero matrix. The one or more processing devices may be further configured to receive an objective function as a user input. The one or more processing devices may be further configured to search over respective candidate invertible bit matrices for a value of the invertible bit matrix that approximately maximizes or minimizes the objective function. The above features may have the technical effect of computing an invertible bit matrix that satisfies a user-defined objective.

According to this aspect, the one or more processing devices may be further configured to receive an objective function as a user input. The one or more processing devices may be further configured to search over respective candidate invertible bit matrices and candidate additional bit matrices for values of the invertible bit matrix and the additional bit matrix that approximately maximize or minimize the objective function. The above features may have the technical effect of computing values of the invertible bit matrix and additional bit matrix that satisfy a user-defined objective.

According to this aspect, the additional bit matrix may be a zero matrix. The one or more processing devices may be further configured to receive a SAT solver as a user input. The one or more processing devices may be further configured to exhaustively search over respective candidate invertible bit matrices for a value of the invertible bit matrix that maximizes or minimizes an objective function of the SAT solver. The above features may have the technical effect of computing a value of the invertible bit matrix that provides an exact solution to the objective function.

According to this aspect, the one or more processing devices may be further configured to receive a SAT solver as a user input. The one or more processing devices may be further configured to exhaustively search over respective candidate invertible bit matrices and candidate additional bit matrices for values of the invertible bit matrix and the additional bit matrix that maximize or minimize an objective function of the SAT solver. The above features may have the technical effect of computing values of the invertible bit matrix and the additional bit matrix that provide an exact solution to the objective function.

According to this aspect, the one or more processing devices may be configured to compute the stabilizer tableau at least in part by computing a plurality of destabilizer check rows of the quantum error correction code. The one or more processing devices may be further configured to compute the stabilizer tableau at least in part by further extending the extended stabilizer form with the destabilizer check rows. The above features may have the technical effect of computing the stabilizer tableau of the quantum error correction code.

According to this aspect, the one or more processing devices may be configured to select the destabilizer check rows as lowest-Hamming-weight destabilizer check rows among a plurality of candidate destabilizer check rows. The above features may have the technical effect of computing a stabilizer tableau that has low Hamming weight.

According to this aspect, the one or more processing devices may be further configured to receive a destabilizer selection objective function as a user input. The one or more processing devices may be further configured to select the destabilizer check rows at least in part by searching over a plurality of candidate destabilizer check rows for destabilizer check rows that approximately maximize or minimize the destabilizer selection objective function. The above features may have the technical effect of selecting destabilizer check rows that satisfy a user-specified destabilizer selection objective function.

According to another aspect of the present disclosure, a method for use with a computing system is provided. The method includes receiving an extended stabilizer form of a quantum error correction code. The method further includes receiving a logical Clifford operation specification of a logical Clifford operation. Based at least in part on the extended stabilizer form, the method further includes computing a stabilizer tableau of the quantum error correction code. Based at least in part on the stabilizer tableau and the logical Clifford operation specification, the method further includes computing a physical representation matrix of the logical Clifford operation. The method further includes outputting the physical representation matrix. The above features may have the technical effect of efficiently computing a physical representation matrix of a logical Clifford operation according to a quantum error correction code.

According to this aspect, the method may further include computing a quantum circuit based at least in part on the physical representation matrix. The method may further include controlling a quantum computing device to implement the logical Clifford operation by executing the quantum circuit. The above features may have the technical effect of performing the logical Clifford operation at the quantum computing device.

According to this aspect, the physical representation matrix may be computed based at least in part on an invertible bit matrix and an additional bit matrix. The above features may have the technical effect of defining parameters with which the physical representation matrix is computed.

According to this aspect, the invertible bit matrix may be an identity matrix, and the additional bit matrix may be a zero matrix. The above features may have the technical effect of allowing the one or more processing devices to compute the physical representation matrix in a low-complexity manner.

According to this aspect, the additional bit matrix may be a zero matrix. Computing the physical representation matrix may include searching over respective candidate invertible bit matrices for a value of the invertible bit matrix that approximately minimizes a Hamming weight of off-diagonal blocks of the physical representation matrix of the logical Clifford operation. The above features may have the technical effect of computing a low-Hamming-weight physical representation matrix.

According to this aspect, computing the stabilizer tableau may include computing a plurality of destabilizer check rows of the quantum error correction code. Computing the stabilizer tableau may further include further extending the extended stabilizer form with the destabilizer check rows. The above features may have the technical effect of computing the stabilizer tableau of the quantum error correction code.

According to this aspect, the method may further include selecting the destabilizer check rows as lowest-Hamming-weight destabilizer check rows among a plurality of candidate destabilizer check rows. The above features may have the technical effect of computing a stabilizer tableau that has low Hamming weight.

According to another aspect of the present disclosure, a computing system is provided, including one or more processing devices configured to receive an extended stabilizer form of a quantum error correction code. The one or more processing devices are further configured to receive a logical Clifford operation specification of a logical Clifford operation. Based at least in part on the extended stabilizer form, the one or more processing devices are further configured to compute a stabilizer tableau of the quantum error correction code at least in part by computing a plurality of destabilizer check rows of the quantum error correction code. The one or more processing devices are further configured to compute the stabilizer tableau at least in part by further extending the extended stabilizer form with the destabilizer check rows. Based at least in part on the stabilizer tableau and the logical Clifford operation specification, the one or more processing devices are further configured to compute a physical representation matrix of the logical Clifford operation. The one or more processing devices are further configured to compute a quantum circuit based at least in part on the physical representation matrix. The one or more processing devices are further configured to control a quantum computing device to implement the logical Clifford operation by executing the quantum circuit. The above features may have the technical effect of efficiently computing a physical representation matrix of a logical Clifford operation according to a quantum error correction code and implementing that Clifford operation at a quantum computing device.

"And/or" as used herein is defined as the inclusive or V, as specified by the following truth table:

| A | B | $A \vee B$ |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:

one or more processing devices configured to:

- receive an extended stabilizer form of a quantum error correction code;
- receive a logical Clifford operation specification of a logical Clifford operation;
- based at least in part on the extended stabilizer form, compute a stabilizer tableau of the quantum error correction code;
- based at least in part on the stabilizer tableau and the logical Clifford operation specification, compute a physical representation matrix of the logical Clifford operation based at least in part on an invertible bit matrix and an additional bit matrix; and
- output the physical representation matrix.

2. The computing system of claim 1, wherein the one or more processing devices are further configured to:

- compute a quantum circuit based at least in part on the physical representation matrix; and
- control a quantum computing device to implement the logical Clifford operation by executing the quantum circuit.

3. The computing system of claim 1, wherein:

the invertible bit matrix is an identity matrix; and the additional bit matrix is a zero matrix.

4. The computing system of claim 1, wherein:

the additional bit matrix is a zero matrix; and the one or more processing devices are configured to search over respective candidate invertible bit matrices for a value of the invertible bit matrix that approximately minimizes a Hamming weight of off-diagonal blocks of the physical representation matrix of the logical Clifford operation.

5. The computing system of claim 1, wherein:
the additional bit matrix is a zero matrix; and
the one or more processing devices are further configured to:
receive an objective function as a user input; and
search over respective candidate invertible bit matrices for a value of the invertible bit matrix that approximately maximizes or minimizes the objective function.

6. The computing system of claim 1, wherein the one or more processing devices are further configured to:
receive an objective function as a user input; and
search over respective candidate invertible bit matrices and candidate additional bit matrices for values of the invertible bit matrix and the additional bit matrix that approximately maximize or minimize the objective function.

7. The computing system of claim 1, wherein:
the additional bit matrix is a zero matrix; and
the one or more processing devices are further configured to:
receive a SAT solver as a user input; and
exhaustively search over respective candidate invertible bit matrices for a value of the invertible bit matrix that maximizes or minimizes an objective function of the SAT solver.

8. The computing system of claim 1, wherein the one or more processing devices are further configured to:
receive a SAT solver as a user input; and
exhaustively search over respective candidate invertible bit matrices and candidate additional bit matrices for values of the invertible bit matrix and the additional bit matrix that maximize or minimize an objective function of the SAT solver.

9. The computing system of claim 1, wherein the one or more processing devices are configured to compute the stabilizer tableau at least in part by:
computing a plurality of destabilizer check rows of the quantum error correction code; and
further extending the extended stabilizer form with the destabilizer check rows.

10. The computing system of claim 9, wherein the one or more processing devices are configured to select the destabilizer check rows as lowest-Hamming-weight destabilizer check rows among a plurality of candidate destabilizer check rows.

11. The computing system of claim 9, wherein the one or more processing devices are further configured to:
receive a destabilizer selection objective function as a user input; and
select the destabilizer check rows at least in part by searching over a plurality of candidate destabilizer check rows for destabilizer check rows that approximately maximize or minimize the destabilizer selection objective function.

12. A method for use with a computing system, the method comprising:
receiving an extended stabilizer form of a quantum error correction code;
receiving a logical Clifford operation specification of a logical Clifford operation;
based at least in part on the extended stabilizer form, computing a stabilizer tableau of the quantum error correction code;
based at least in part on the stabilizer tableau and the logical Clifford operation specification, computing a physical representation matrix of the logical Clifford operation based at least in part on an invertible bit matrix and an additional bit matrix; and
outputting the physical representation matrix.

13. The method of claim 12, further comprising:
computing a quantum circuit based at least in part on the physical representation matrix; and
controlling a quantum computing device to implement the logical Clifford operation by executing the quantum circuit.

14. The method of claim 12, wherein:
the invertible bit matrix is an identity matrix; and
the additional bit matrix is a zero matrix.

15. The method of claim 12, wherein:
the additional bit matrix is a zero matrix; and
computing the physical representation matrix includes searching over respective candidate invertible bit matrices for a value of the invertible bit matrix that approximately minimizes a Hamming weight of off-diagonal blocks of the physical representation matrix of the logical Clifford operation.

16. The method of claim 12, wherein computing the stabilizer tableau includes:
computing a plurality of destabilizer check rows of the quantum error correction code; and
further extending the extended stabilizer form with the destabilizer check rows.

17. The method of claim 16, further comprising selecting the destabilizer check rows as lowest-Hamming-weight destabilizer check rows among a plurality of candidate destabilizer check rows.

18. A computing system comprising:
one or more processing devices configured to:
receive an extended stabilizer form of a quantum error correction code;
receive a logical Clifford operation specification of a logical Clifford operation;
based at least in part on the extended stabilizer form, compute a stabilizer tableau of the quantum error correction code at least in part by:
computing a plurality of destabilizer check rows of the quantum error correction code; and
further extending the extended stabilizer form with the destabilizer check rows;
based at least in part on the stabilizer tableau and the logical Clifford operation specification, compute a physical representation matrix of the logical Clifford operation;
compute a quantum circuit based at least in part on the physical representation matrix; and
control a quantum computing device to implement the logical Clifford operation by executing the quantum circuit.

* * * * *